US011452258B2

(12) United States Patent
Zhang et al.

(10) Patent No.: US 11,452,258 B2
(45) Date of Patent: Sep. 27, 2022

(54) GRASS TRIMMER

(71) Applicant: Nanjing Chervon Industry Co., Ltd., Nanjing (CN)

(72) Inventors: Qi Zhang, Nanjing (CN); Zhifeng Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 348 days.

(21) Appl. No.: 16/735,989

(22) Filed: Jan. 7, 2020

(65) Prior Publication Data

US 2021/0204474 A1 Jul. 8, 2021

(51) Int. Cl.
*A01D 34/416* (2006.01)
*A01D 101/00* (2006.01)

(52) U.S. Cl.
CPC ...... *A01D 34/4166* (2013.01); *A01D 2101/00* (2013.01)

(58) Field of Classification Search
CPC ............ A01D 34/4166; A01D 2101/00; A01D 34/4161; A01D 34/006; A01D 34/4163; A01D 34/4162; A01D 34/78; A01D 34/4167; G16H 10/20; G16H 40/63
USPC .................................. 30/276; 56/10.2, 10.5
See application file for complete search history.

(56) References Cited

U.S. PATENT DOCUMENTS

| 3,174,471 | A | * | 3/1965 | Weglage | ................... F02N 3/02 |
| | | | | | 123/185.5 |
| 6,487,780 | B1 | | 12/2002 | Peterson et al. | |
| 10,440,882 | B2 | | 10/2019 | Guo et al. | |
| 10,856,466 | B2 | * | 12/2020 | Guo | .................... A01D 34/4166 |
| 2004/0134078 | A1 | * | 7/2004 | Pfaltzgraff | ......... A01D 34/4163 |
| | | | | | 30/276 |
| 2015/0223395 | A1 | * | 8/2015 | Pellenc | .............. A01D 34/4166 |
| | | | | | 30/276 |
| 2018/0098493 | A1 | | 4/2018 | Sergyeyenko et al. | |
| 2018/0271012 | A1 | * | 9/2018 | Guo | .................... A01D 34/4166 |
| 2021/0137004 | A1 | * | 5/2021 | Nie | ....................... A01D 34/416 |
| 2021/0321560 | A1 | * | 10/2021 | Dai | ..................... A01D 34/4166 |

FOREIGN PATENT DOCUMENTS

| CN | 203633147 U | 6/2014 |
| WO | 2019/029335 A1 | 2/2019 |

* cited by examiner

*Primary Examiner* — Ghassem Alie
(74) *Attorney, Agent, or Firm* — Greenberg Traurig, LLP

(57) ABSTRACT

A grass trimmer includes a trimmer head, a driving device, and an operating device. The trimmer head includes a spool and a head housing. The driving device includes a motor. The grass trimmer has an automatic winding mode in which the motor drives the spool or the head housing to cause the spool and the head housing to rotate relatively so as to wind the trimmer line onto the spool. The grass trimmer further includes a winding switch for controlling the automatic winding mode to be enabled, an operating assembly for controlling the winding switch to be opened, and a locking mechanism. When the operating assembly is operated, the locking mechanism is able to lock the head housing or the spool and the winding switch is triggered so as to cause the head housing and the spool to rotate relatively.

14 Claims, 23 Drawing Sheets

GRASS TRIMMER

TECHNICAL FIELD

The present disclosure relates to a garden tool, in particular, to a grass trimmer.

BACKGROUND

The grass trimmer is a garden tool used for trimming lawns. The grass trimmer includes a trimmer head. The trimmer head rotates at a high speed to drive a trimmer line mounted on the trimmer head to rotate so as to implement the cutting function.

The trimmer head includes a spool for the trimmer line to wind around, and the trimmer line is gradually consumed due to wear when the grass trimming operation is performed. After operating for a period of time, the user needs to replace the trimmer line with a new trimmer line and wind the new trimmer line onto the spool. For a traditional grass trimmer, the user needs to manually rotate the spool to wind the trimmer line onto the spool, which is troublesome to operate and low in winding speed. In some grass trimmers with an automatic winding mode, the switch and the locking mechanism for enabling and disabling the automatic winding mode are complicated, and it is not convenient for the user to operate.

SUMMARY

In one aspect of the disclosure, a grass trimmer includes a trimmer head including a spool and a head housing, wherein the spool is configured for a trimmer line to wind around and the head housing is configured to accommodate at least part of the spool, a driving device configured to drive the trimmer head to rotate around an axis wherein the driving device includes a motor having an output shaft and the grass trimmer has an automatic winding mode in which the motor is configured to drive at least one of the spool or the head housing to cause a relative rotation between the spool and the head housing so as to wind the trimmer line onto the spool, an operating assembly including a operating portion operated by a user, a winding switch configured to control the automatic winding mode to be enabled when the operating portion is operated, and a locking mechanism, wherein when the operating portion is operated, the operating assembly triggers the winding switch and causes the locking mechanism to lock at least one of the head housing or the spool so as to cause the relative rotation between the spool and the head housing.

Further, the operating assembly may include a first trigger portion configured to release the rotation of the head housing or the spool when the operating portion is moved to a first position and lock the rotation of the head housing or the spool when the operating portion is moved to a second position, and a second trigger portion configured to close the winding switch when the operating portion is moved to the first position and activate the winding switch when the operating portion is moved to the second position.

Further, the locking mechanism and the head housing may rotate synchronously and the operating assembly limits the rotation of the locking mechanism to lock the rotation of the head housing when the operating portion moves to the second position.

Further, the operating assembly may include an operating member formed with the operating portion, and a locking element configured to be coupled with the operating member wherein the locking mechanism rotates synchronously with the head housing and the locking member is driven by the operation member to move to a position where locking mechanism is locked.

Further, the locking mechanism and the spool may rotate synchronously and the operating assembly limits the rotation of the locking mechanism to lock the rotation of the spool when the operating portion moves to the second position.

Further, the operating assembly may include an operating member forming the operating portion and a locking element configured to be coupled with the operating member wherein the locking mechanism rotates synchronously with the spool and the locking member is driven by the operation member to move to a position where locking mechanism is locked.

Further, the grass trimmer may include a rear housing formed with a coupling portion for coupling an energy source and a connecting rod for connecting the driving device and the rear housing wherein the rear housing is disposed at a rear end of the connecting rod and the operating assembly is disposed at a front end of the connecting rod.

Further, the winding switch may be disposed at the front end of the connecting rod.

Further, the driving device may include a front housing formed with a receiving cavity for receiving the motor where the front housing is connected with a mounting portion for mounting the winding switch.

Further, the locking mechanism may include a first rotating piece, which is configured to rotate synchronously with the spool or the head housing; and the operating assembly may include a first trigger portion, which is configured to release rotation of the first rotating piece in condition that the operating assembly is moved to a first position and lock the rotation of the first rotating piece in condition that the operating assembly is moved to a second position, and a second trigger portion, which is configured to close the winding switch in condition that the operating assembly is moved to the first position and drive the winding switch to be opened in condition that the operating assembly is moved to the second position.

Further, the locking mechanism may include a first rotating piece, which is configured to rotate synchronously with the spool or the head housing; and the operating assembly may include a knob which is formed with the operating portion and a locking element which is configured to lock the rotation of the first rotating piece when the knob is operated by the user, wherein the knob and the locking element form a whole capable of moving together.

Further, the locking element may be a locking pin, the first rotating piece may be formed with a limiting portion for mating with the locking pin where the locking pin locks the rotation of the first rotation piece when the locking pin moves to mate with the limiting portion.

Further, the grass trimmer may include an elastic piece which is configured to reset the operating portion.

Further, the trimmer head may rotate clockwise about the axis and rotate counterclockwise about the axis when the operating portion is not operated.

Further, the head housing may rotate clockwise about the axis and rotate counterclockwise about the axis when the operating portion is not operated.

In another aspect of the disclosure, a grass trimmer includes a trimmer head including a spool and a head housing, wherein the spool is configured for a trimmer line winding around and the head housing is configured to accommodate at least part of the spool, a driving device configured to drive the trimmer head to rotate around an axis wherein the driving device includes a motor having an output shaft, the grass trimmer has a weeding mode and an automatic winding mode, the motor drives the trimmer head to rotate around the axis in a first rotation direction when the grass trimmer is in the weeding mode, and the motor drives the spool or the head housing so that the spool has a relative rotation relative to the head housing in a second rotation direction opposite to the first rotation direction when the grass trimmer is in the automatic winding mode, a starting device for driving the grass trimmer into the automatic winding mode wherein the starting device includes a operating portion for a user to operate, a winding switch configured to control the automatic winding mode to be enabled when the operating portion is operated, and a trigger portion configured to move to a first position to release rotation of the head housing or the spool when the operating portion is not operated, and move to a second position to lock the rotation of the head housing or the spool when the operating portion is operated.

Further, the grass trimmer may include a rear housing formed with a coupling portion for coupling an energy source and a connecting rod for connecting the driving device and the rear housing; wherein the rear housing is disposed at a rear end of the connecting rod and the operating portion is disposed at a front end of the connecting rod.

Further, the winding switch may be disposed at the front end of the connecting rod.

Further, the driving device may include a front housing formed with a receiving cavity for receiving the moto, and the front housing is connected with a mounting portion for mounting the winding switch.

Further, the starting device may include a locking element formed with the trigger portion where the locking element is connected the front housing.

The present disclosure has the advantages as follows: an operating assembly capable of linking a locking mechanism and a switching mechanism is provided, and when a user operates the operating assembly, the locking mechanism can be locked, and then one of a head housing and a spool is locked to cause the head housing and the spool to rotate relatively, and a winding switch is then opened; the operating assembly and the locking mechanism are high in reliability and simple in structure, a linkage relationship exists between the locking mechanism and the winding switch, and the operation is simple for the user.

DETAILED DESCRIPTION

Figure 1:
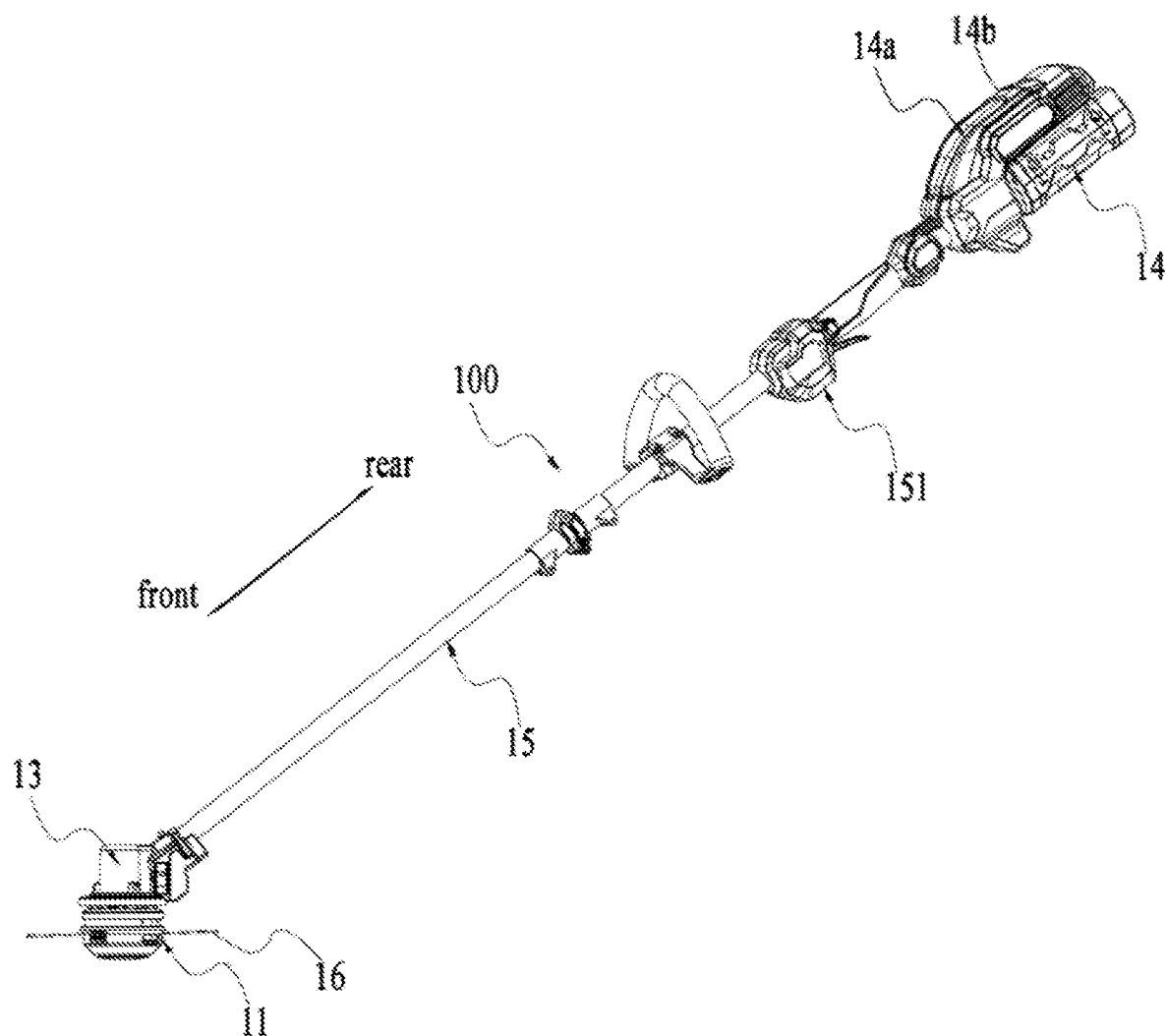
FIG. 1 is a perspective view of an example grass trimmer.

The present disclosure will be described below in detail in conjunction with the drawings and specific examples.

FIGS. 1 to 4 show a grass trimmer 100 in the first example. In the present example, the grass trimmer 100 includes: a trimmer head 11, a driving device 13, an energy source 14, a connecting rod 15 and an operating device 151. The driving device 13 may specifically include a motor 13a and a front housing 13b, the motor 13a has an output shaft 131, and front housing 13b formed with a receiving cavity 13c for receiving the motor 13a. The energy source 14 may be a battery pack for supplying a source of electric power to the motor. The connecting rod 15 connects the driving device 13 and the energy source 14. The grass trimmer 100 further comprises a rear housing 14a formed with a coupling portion 14b for coupling the energy source 14, and connecting rod 15 is connected the driving device 13 and the rear housing 14a. The rear housing 14a is disposed at a rear end of the connecting rod 15, and the front housing 13b is disposed at a front end of the connecting rod 15. The driving device 13 drives the trimmer head 11 to rotate around an axis 101 for implementing the grass-trimming function. The operating device 151 is configured to be operated by a user so as to control the grass trimmer 100.

The trimmer head 11 is configured for mounting a trimmer line 16. When the trimmer head 11 is driven by the driving device 13 to rotate around the axis 101, the trimmer head 11 drives the trimmer line 16 to rotate at a high speed so as to achieve the purpose of cutting lawns and weeds. The trimmer head 11 includes a spool 12 and a head housing 111. The spool 12 is configured for a trimmer line 16 to wind around and is accommodated in the head housing 111, and the spool 12 is mounted or formed with a winding portion. The head housing 111 is formed with an external threading hole 111d for the trimmer line 16 to pass through, and the external threading hole 111d is further provided with a thread outlet buckle. In an example, the head housing 111 includes a first shell portion 111a and a second shell portion 111c, which facilitate assembly of the head housing 111 with the spool 12 and also facilitates a user opening the head housing 111 to detect a condition inside the head housing 111.

The trimmer line 16 is worn when cutting vegetation, so the user needs to wind a certain length of the trimmer line 16 on the spool 12 in advance. The spool 12 and the head housing 111 may rotate relatively to achieve automatic winding. The principle and specific structure of automatic winding are well known in the art, and detailed description need not be provided.

The grass trimmer 100 in the present example has an automatic winding mode and a weeding mode for cutting vegetation. The motor 13a drives the trimmer head 11 to rotate around the axis 101 in a first rotation direction when the grass trimmer 100 is in the weeding mode. When the grass trimmer 100 is in the automatic winding mode, the motor 13a drives at least one of the spool 12 or the head housing 111 to cause a relative rotation between the spool 12 and the head housing 111 so as to wind the trimmer line 16 onto the spool 12. The motor 13a drives the spool 12 or the head housing 111 so that the spool 12 has a relative rotation relative to the head housing 111 in a second rotation direction opposite to the first rotation direction when the grass trimmer 100 is in the automatic winding mode.

Figure 2:
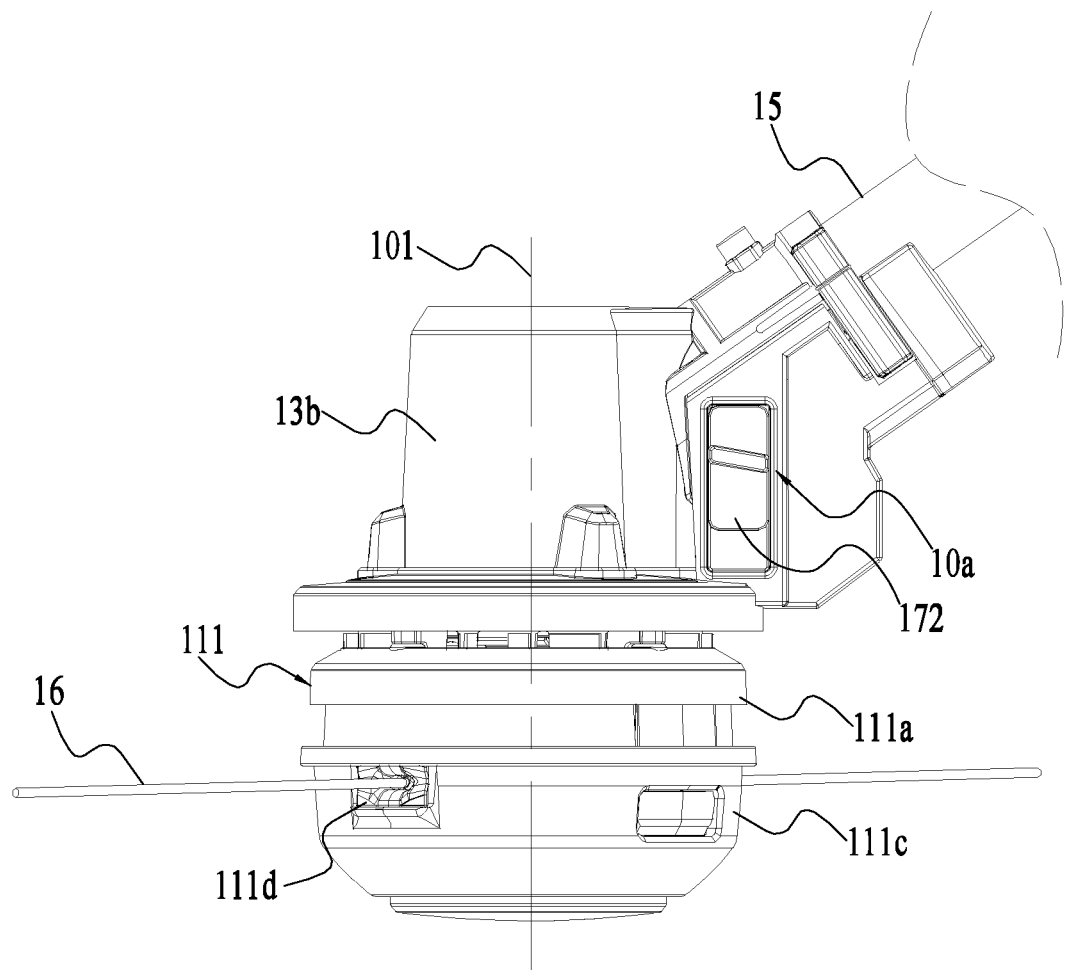
FIG. 2 is a partial perspective view of the grass trimmer of FIG. 1.
Figure 3:
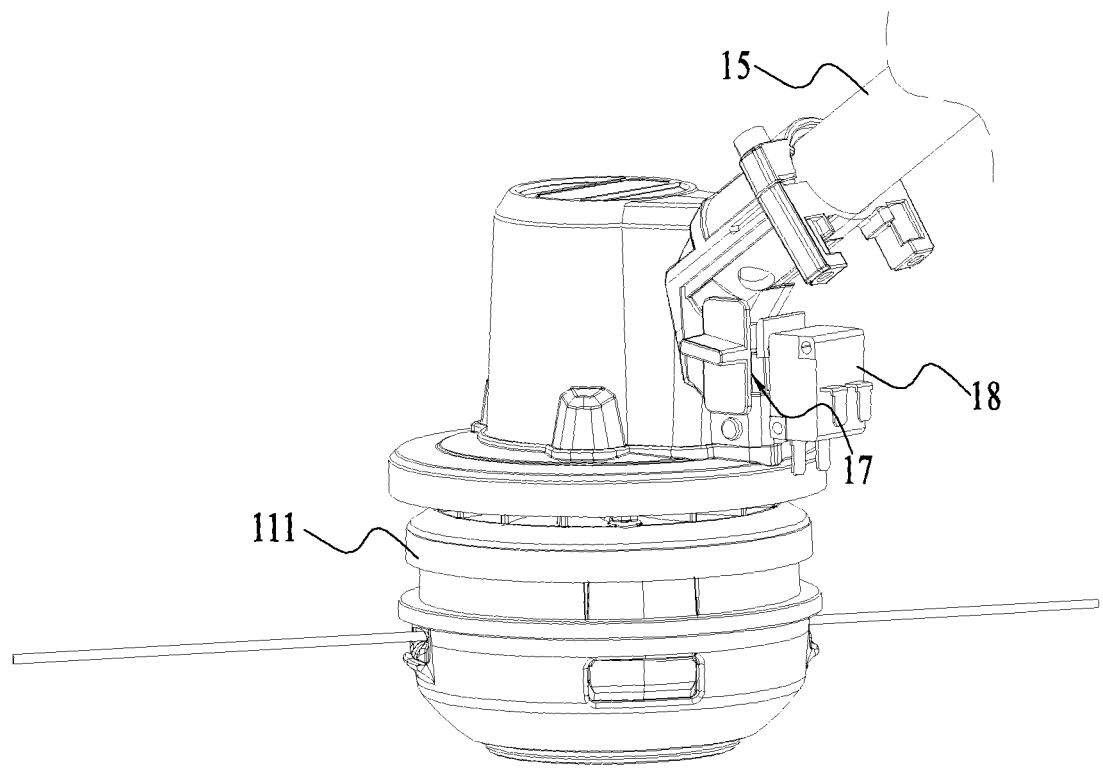
FIG. 3 is a perspective view of the grass trimmer of FIG. 2 with a portion of a casing removed.
Figure 4:
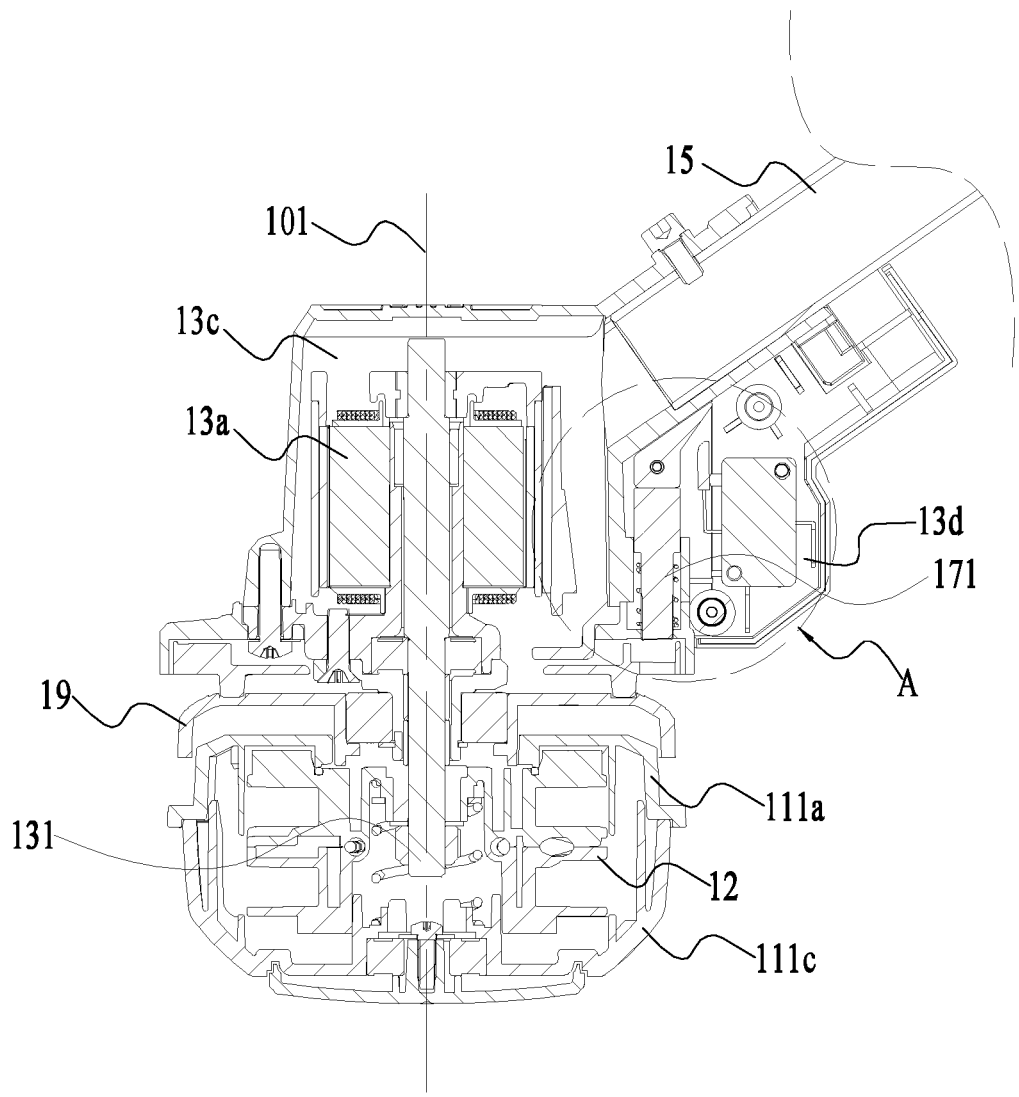
FIG. 4 is a sectional view of the grass trimmer of FIG. 2.

As shown in FIGS. 2 to 4, the grass trimmer 100 further includes a starting device 10a for driving the grass trimmer 100 into the automatic winding mode and the starting device 10a comprises an operating assembly 17, a winding switch 18, and a locking mechanism 19. The operating assembly 17 comprises a locking element and an operating member 172, the locking element is a locking pin 171, the operating member 172 is formed with an operating portion 172a for a user to operate, and the locking element couples with the operating member 172. The winding switch 18 is electrically connected to the motor 13a. The winding switch 18 controls the automatic winding mode to be enabled when the operating portion 172a is operated. The locking mechanism 19 is used to lock at least one of the spool 12 or the head housing 111 to cause the spool 12 and the head housing 111 to rotate relatively when the operating portion 172a is operated. The locking pin 171 has a first position and a second position. The winding switch 18 is a trigger switch and is located close to the locking pin 171. The locking pin 171 and the winding switch 18 can be sequentially triggered to enable the automatic winding mode. When the automatic winding mode is enabled, the rotation of one of the head housing 111 or the spool 12 is locked by the locking mechanism 19, the relative rotation is generated between the head housing 111 and the spool 12, and the winding switch 18 controls the motor 13a to start and winding begins. Specifically, in the present example, when the locking pin 171 is located at the first position, the head housing 111 and the spool 12 can be driven by the driving device 13 to synchronously rotate. When the locking pin 171 is located at the second position, the locking pin 171 locks the locking mechanism 19, the locking mechanism 19 locks the head housing 111, and at this time, the rotation of the head housing 111 is limited, and relative rotation between the head housing 111 and the spool 12 can be generated. Next, the winding switch 18 is triggered and the motor 13a drives the spool to rotate to achieve winding. It can be understood that the aforementioned trigger action represents merely one mechanical action and that no time consistency exists for the transmission of the electrical signal within the winding switch 18 and the starting of the motor. That is, when the winding switch 18 is triggered, the motor 13a may be started immediately or may be started in a delayed manner, which is not limited herein.

The operating assembly 17 is disposed at the front end of the connecting rod 15, the winding switch 18 is disposed at the front end of the connecting rod, and the front housing 13b is connected with a mounting portion 13d for mounting the winding switch 18.

Figure 5:
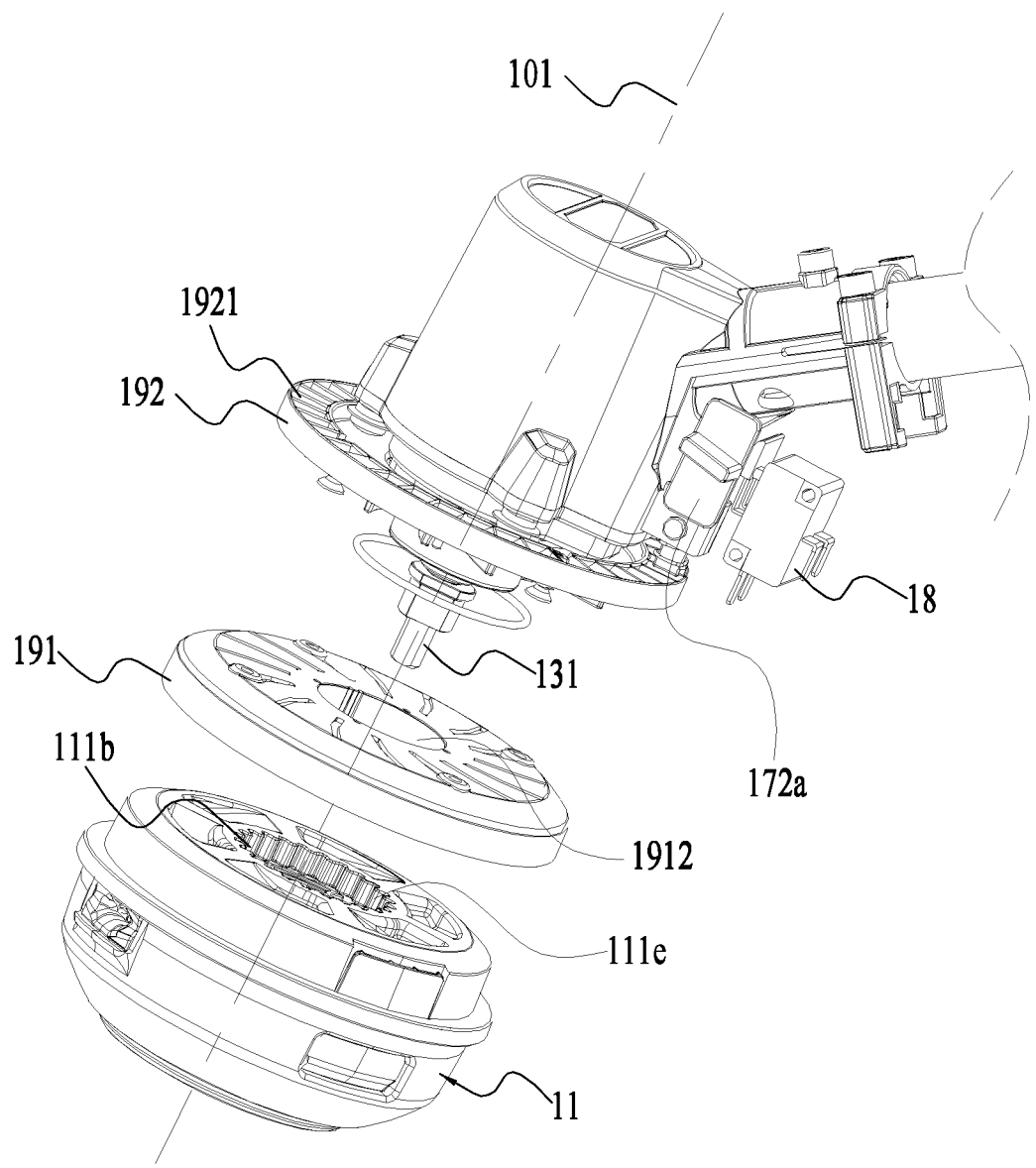
FIG. 5 is an exploded view of the grass trimmer of FIG. 2.
Figure 6:
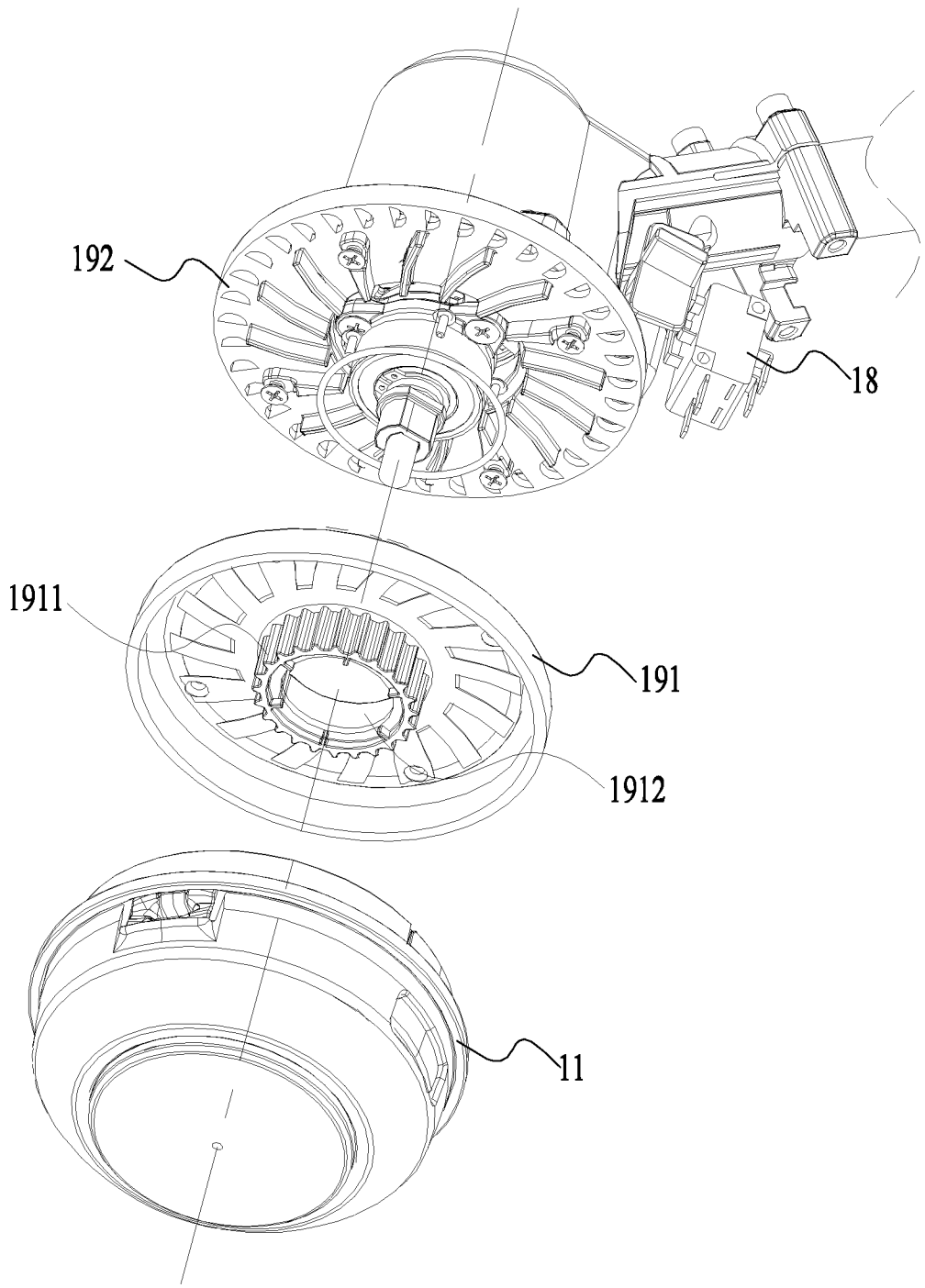
FIG. 6 is an exploded view of the grass trimmer of FIG. 5 taken from another perspective.
Figure 7:
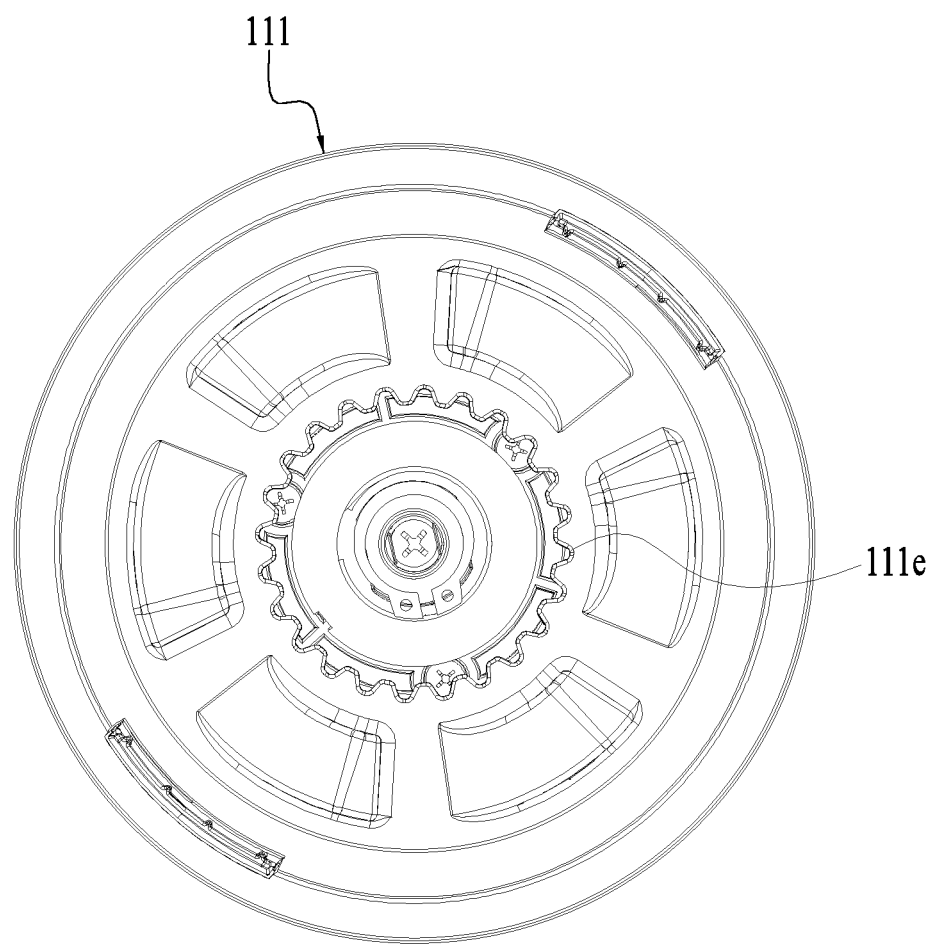
FIG. 7 is a top view of a trimmer head of the grass trimmer of FIG. 6.

As shown in FIGS. 5 to 7, in an example, the locking mechanism 19 is specifically a set of support plate assemblies including a first rotating piece 191 and a second rotating piece 192, and the first rotating piece 191 and the second rotating piece 192 are fixedly connected to each other or integrally formed. More specifically, the first rotating piece 191 is rotatably connected to the output shaft 131, and the second rotating piece 192 can rotate synchronously with the first rotating piece 191 around the axis 101. The first rotating piece 191 is formed with or connected to a first limiting portion 1911, and the second rotating piece 192 is formed with or connected to a second limiting portion 1921. In the present example, the second limiting portion 1921 is specifically limiting holes uniformly distributed in the circumferential direction of the second rotating piece 192 around the axis 101. The first shell portion 111a of the head housing 111 is formed with or connected to a third limiting portion 111e that cooperates with the first limiting portion 1911. The first limiting portion 1911 cooperates with the third limiting portion 111e so that the head housing 111 and the first rotating piece 191 are axially movable in the axis 101 direction without relative movement in the circumferential direction around the axis 101. The second rotating piece 192 is formed with or connected to a fan blade for generating airflow. The motor 13a can drive the fan to rotate to generate airflow.

Specifically, the first rotating piece 191 is formed with a first through hole 1912 through which the output shaft 131 passes, and the second rotating piece 192 is formed with a second through hole through which the output shaft 131 passes. The first rotating piece 191 extends around the first through hole 1912 in the axis 101 direction to form the first limiting portion 1911, and the first limiting portion 1911 is formed towards the trimmer head 11. The first limiting portion 1911 has an external gear structure having straight teeth uniformly distributed around the first through hole 1912 in the axis 101 direction.

The first shell portion 111a is formed with a third through hole 111b through which the output shaft 131 passes, the third limiting portion 111e cooperating with the first limiting portion 1911 is formed in the third through hole 111b, and the third limiting portion 111e is formed around the third through hole 111b. The third limiting portion 111e has an internal gear structure having straight teeth uniformly distributed around the third through hole 111b in the axis 101 direction. When the first limiting portion 1911 cooperates with the third limiting portion 111e, the external gear structure of the first limiting portion 1911 is engaged with the internal gear structure of the third limiting portion 111e. At this time, the first shell portion 111a and the locking mechanism 19 can rotate synchronously in the circumferential direction around the axis 101, and axial displacement may also be generated between the first shell portion 111a and the locking mechanism 19 in the axis 101 direction. The locking mechanism 19 and the head housing 111 rotate synchronously, and the operating assembly 17 limits the rotation of the locking mechanism 19 to lock the rotation of the head housing 111 when the operating portion 172a moves to the second position. In some other examples, the locking mechanism and the spool rotate synchronously, the operating assembly limits the rotation of the locking mechanism to lock the rotation of the spool when the operating portion moves to the second position, and the locking member is driven by the operation member to move to a position where locking mechanism is locked.

The locking pin 171 and the winding switch 18 are selectively mounted at the connection of the driving device 13 and the connecting rod 15. In the present example, a casing for mounting the locking pin 171 and the winding switch 18 is formed or connected at the connection of the driving device 13 and the connecting rod 15, and the casing forms an accommodating space for accommodating the locking pin 171, the winding switch 18, and other electrical components. In some optional examples, the locking pin 171 is arranged parallel to the output shaft 131, is mounted at the end of the connecting rod 15, and can protrude outside the casing. The winding switch 18 is arranged adjacent to the locking pin 171 and inside the casing. When the locking pin 171 is inserted into the limiting hole on the second rotating piece 192 in the direction of the output shaft 131, the winding switch 18 is then triggered and the motor 13a is started to begin driving the spool 12 to be wound.

Figure 8:
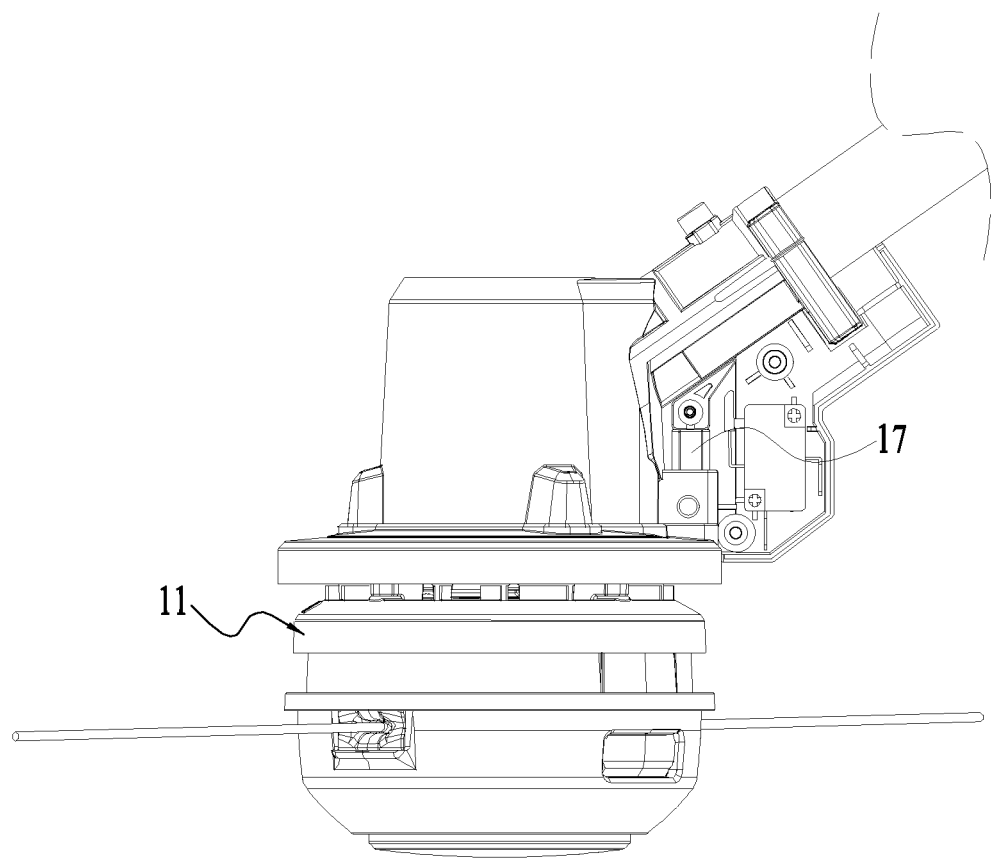
FIG. 8 is a perspective view of the grass trimmer of FIG. 2 when an operating assembly is in a first position.
Figure 9:
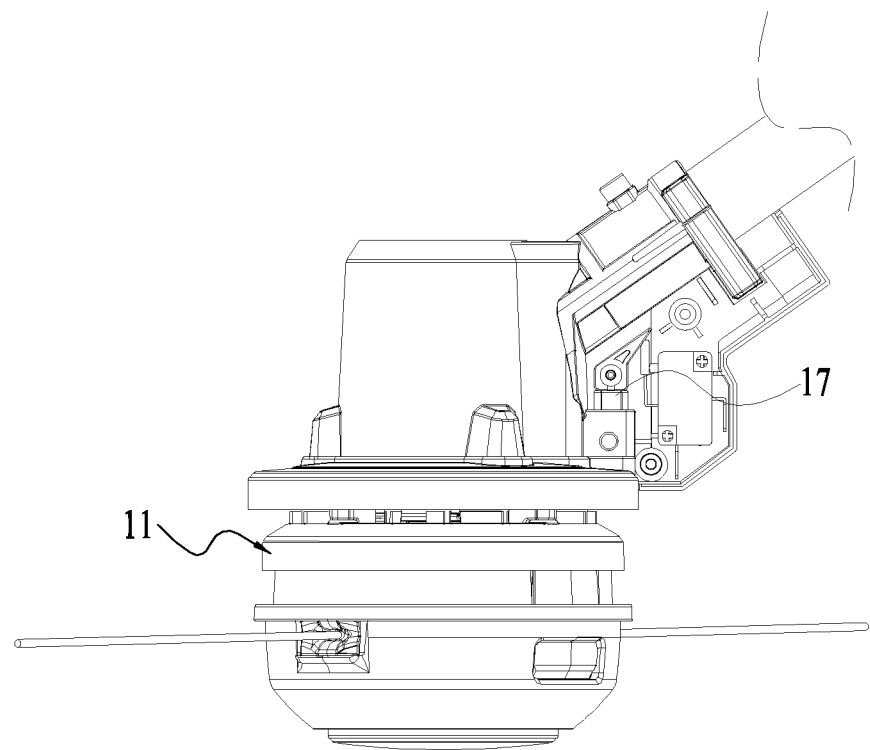
FIG. 9 is a perspective view of the grass trimmer of FIG. 2 when an operating assembly is in a second position.
Figure 10:
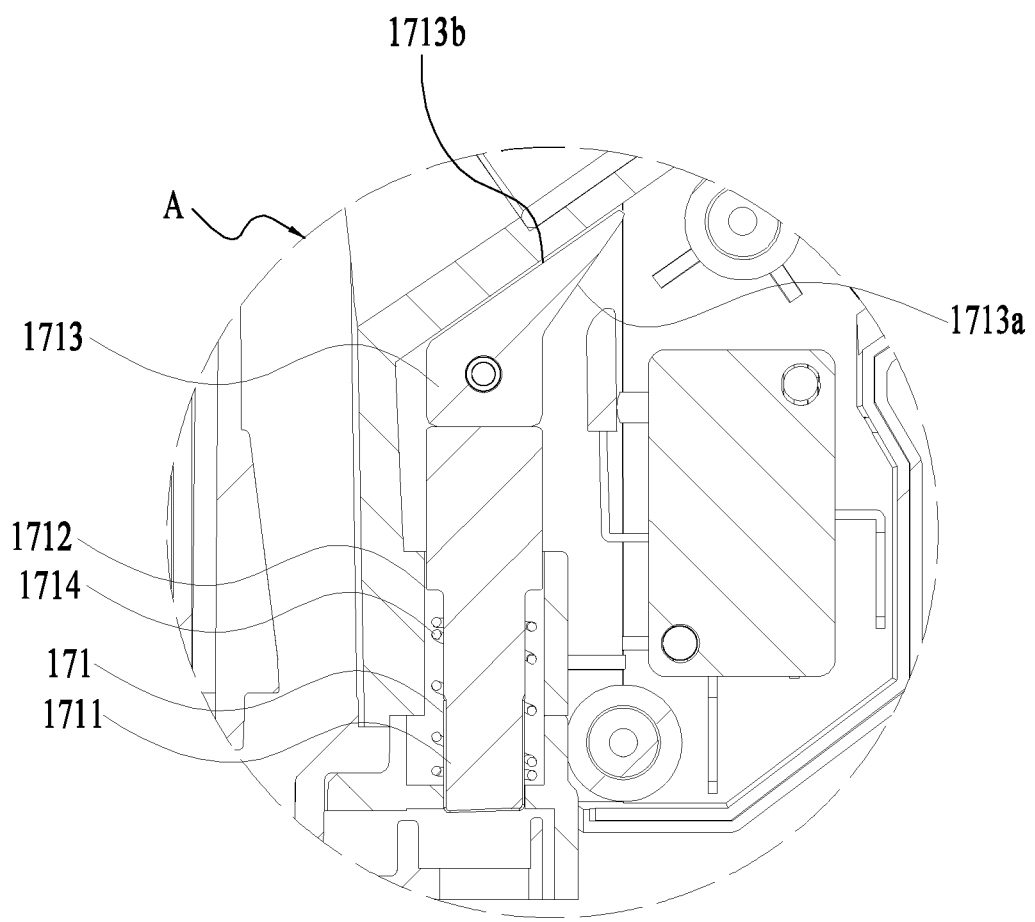
FIG. 10 is an enlarged partial view of section A of the grass trimmer of FIG. 2.

As shown in FIGS. 8 to 10, the locking pin 171 includes a first end and a second end, where the first end is formed with or connected to a first trigger portion 1711 to be inserted into the limiting hole. In a direction parallel to the axis 101, the first trigger portion 1711 is formed with a protruding portion 1712 for limiting facing toward the locking mechanism. During assembly, the first trigger portion 1711 is sleeved with an elastic piece 1714 which causes the locking pin 171 to be reset after the locking pin is inserted into the limiting hole. Specifically, one end of the elastic piece 1714 abuts against the casing, and another end of the elastic piece 1714 abuts against the protruding portion 1712. Thereby, elastic piece 1714 resets the operating portion 172a. More specifically, a knob operable by a user is formed on or connected to a side surface of the locking pin 171. The knob may be arranged in any shape so long as it is convenient for a user to operate. When the user operates the knob to cause the locking pin 171 to be inserted into the limiting hole, the elastic piece 1714 is compressed and is in an energy storage state; when the locking pin 171 needs to be reset to the first position, merely the knob needs to be released, and the locking pin 171 automatically resets to the first position under the elastic force of the elastic piece 1714.

The second end of the locking pin 171 is formed with or connected to a second trigger portion 1713. The second trigger portion 1713 is formed with or connected to a trigger surface 1713a which can be triggered and can open the winding switch 18. The trigger surface 1713a extends away from the axis 101 to a preset length at an angle greater than 0° and less than 180°. A certain gap further exists between the trigger surface 1713a and the winding switch 18, so as to avoid the winding switch 18 from being opened immediately when the user toggles the knob to lock the head housing 111, and then to avoid the motor 13a from being overloaded or the internal structure of the internal trimmer head 11 from being damaged. The above gap is a safe distance that the winding switch 18 can be opened after the head housing 111 is completely locked. It can be understood that the locking of the head housing 111 and the opening of the winding switch 18 is a continuous process that is essentially not sequential. The second trigger portion 1713 is further formed with an abutting surface 1713b which abuts against an end facing away from the locking mechanism. The abutting surface 1713b, the protruding portion 1712 and the elastic piece 1714 are arranged so that the movement of the locking pin 171 in the direction parallel to the axis 101 is limited within a certain range.

The first trigger portion releases the rotation of the head housing 111 or the spool 12 when the operating portion 172a is moved to a first position, and locks the rotation of the head housing 111 or the spool 12 when the operating portion 172a is moved to a second position. The second trigger portion 1713 closes the winding switch 18 when the operating portion 172a is moved to the first position, and activates the winding switch 18 when the operating portion 172a is moved to the second position.

When the user needs winding, the knob is toggled. At this time, the locking pin 171, driven by the knob, overcomes the elastic force of the elastic piece 1714, extends out to the second position, and enters the limiting hole of the second rotating piece 192, and then the rotation of the second rotating piece 192 is limited. Since the second rotating piece 192 and the first rotating piece 191 are fixedly connected to each other, the first rotating piece 191 is also limited while the second rotating piece 192 is limited, and at this time, the rotation of the entire locking mechanism around the output shaft 131 is limited. Further, the rotation of the head housing 111 is limited under the cooperation of the first limiting portion 1911 and the third limiting portion 111e. At this time, relative movement can be generated between the head housing 111 and the spool 12. When the rotation of head housing 111 is limited, the winding switch 18 is triggered, the motor 13a is started under the control of the winding switch 18 and drives the spool 12 to rotate at a high speed relative to the head housing 111, the trimmer line 16 is wound onto the spool 12, and until the winding is completed, the user loosens the knob, the locking pin 171 resets to the first position under the action of the elastic piece 1714 and faces away from the winding switch 18, the motor 13a stops rotating, and winding ends.

When the operating portion 172a is not operated, the trimmer head 11 is capable of rotating clockwise about the axis 101 and also rotating counterclockwise about the axis 101, the head housing 111 is capable of rotating clockwise about the axis 101 and also rotating counterclockwise about the axis 101.

Figure 11:
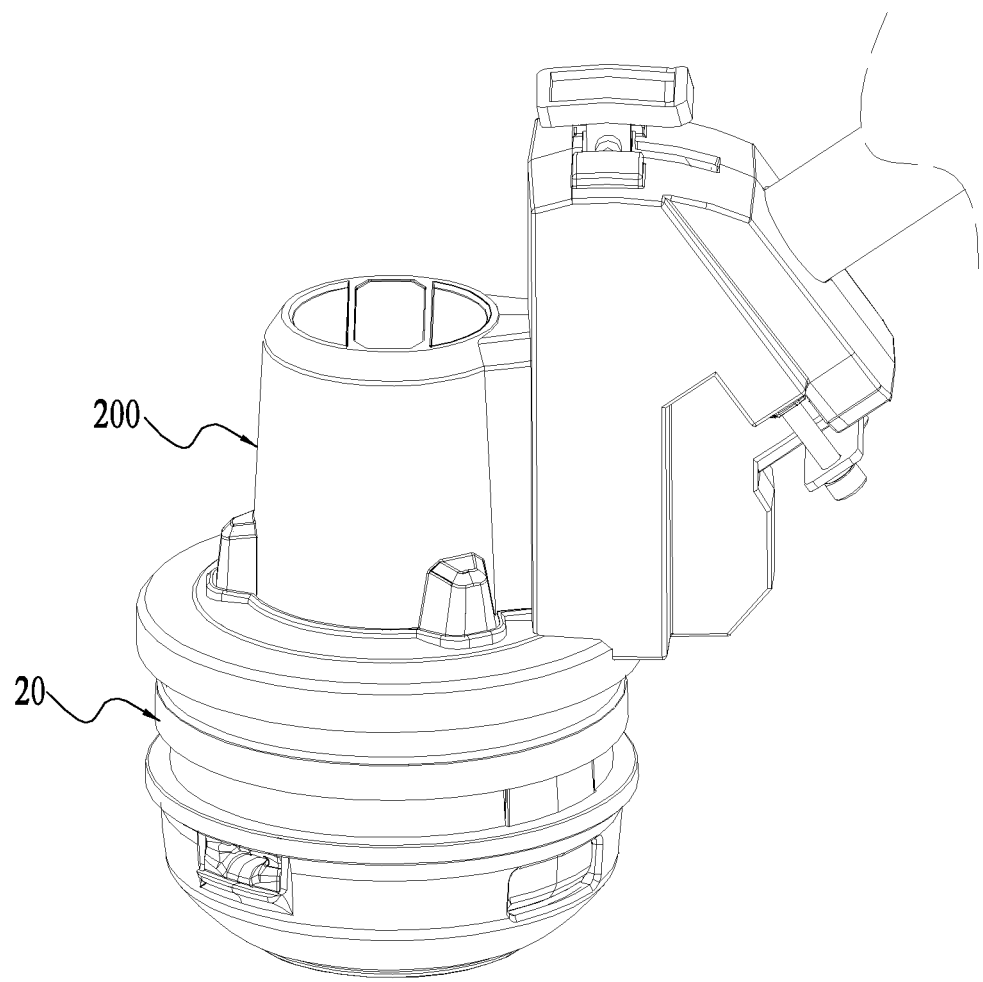
FIG. 11 is a partial perspective view of an example grass trimmer.

FIG. 11 shows a partial structure of a grass trimmer 200 according to a second example. The automatic winding structure of the grass trimmer 200 in the present example is substantially the same as that in the first example. Specifically, when the grass trimmer 200 is in an automatic winding mode, the grass trimmer 200 may have a trimmer head 20 and a winding switch 21 which are the same as the trimmer head and the winding switch in the first example, and differs in the specific structure of the locking mechanism 23 and the trigger manner and specific structure of the operating assembly 22. The portions of the first example that are compatible with the present example may be applied to the present example, and merely the differences between the present example and the first example will be described below.

Figure 12:
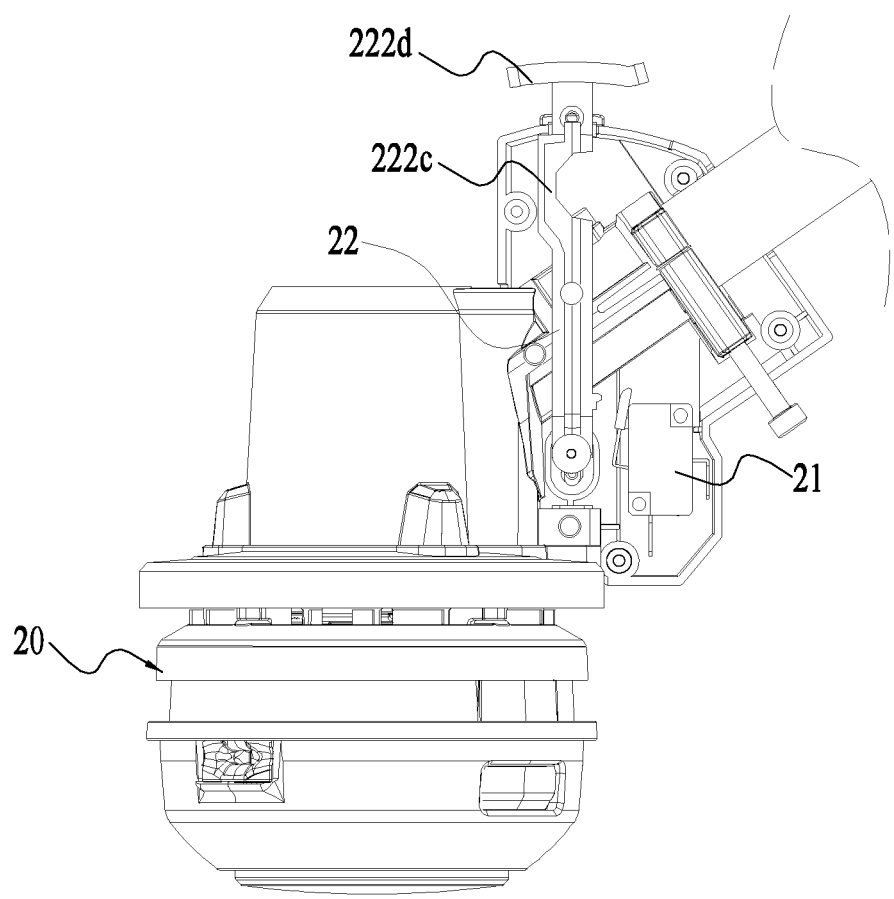
FIG. 12 is a perspective view of the grass trimmer of FIG. 11 when a trigger rod is in an initial position.
Figure 13:
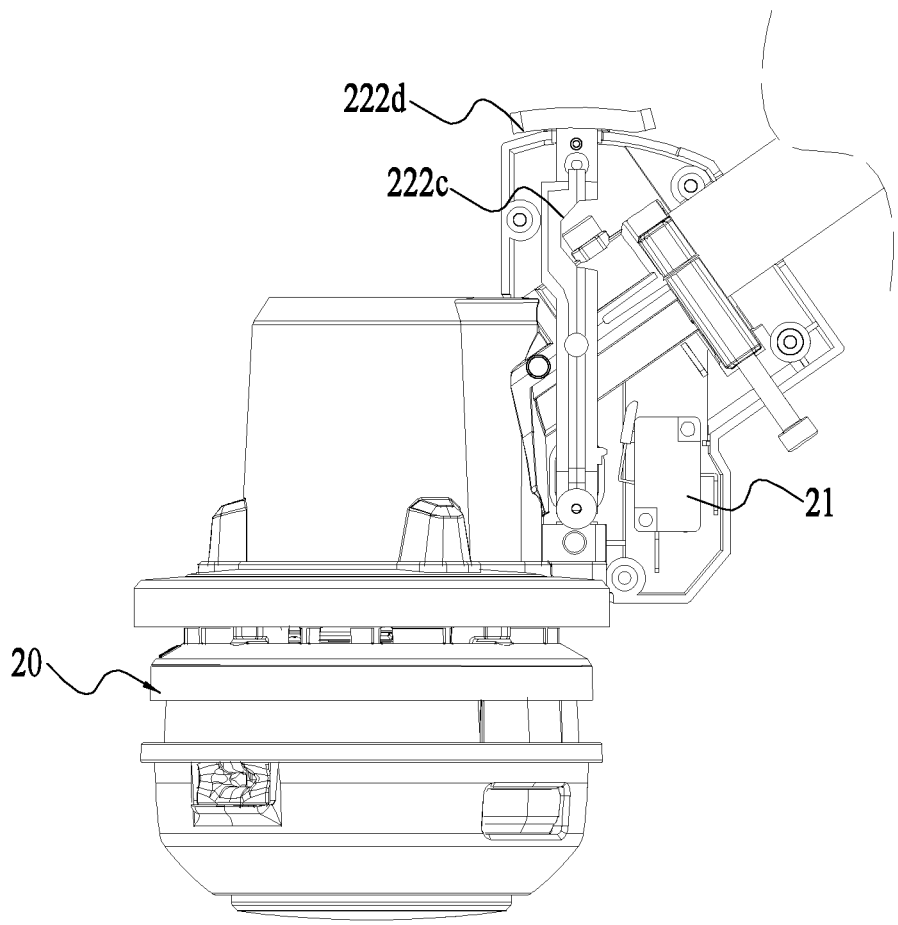
FIG. 13 is a perspective view of the grass trimmer of FIG. 11 when a trigger rod is in a first position.
Figure 14:
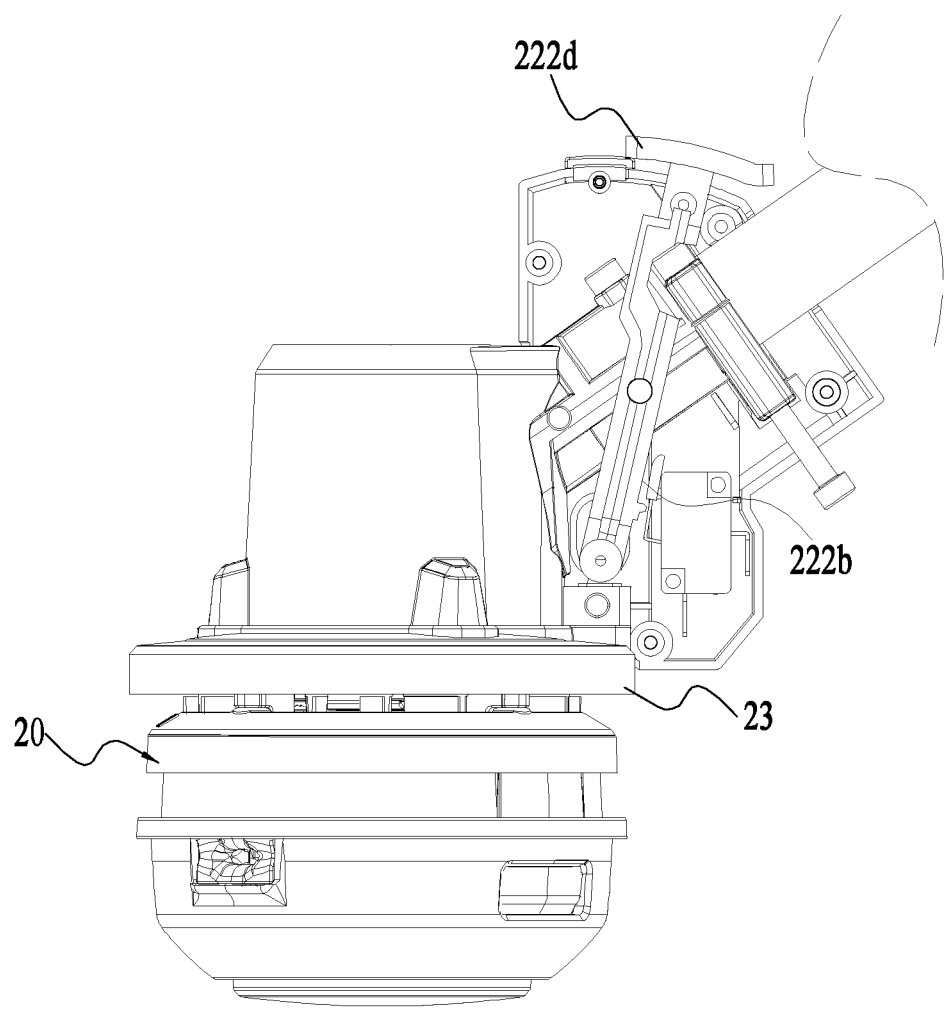
FIG. 14 is a perspective view of the grass trimmer of FIG. 11 when a trigger rod is in a second position.

As shown in FIGS. 12 to 14, in the present example, the operating assembly 22 includes a locking pin 221 and a trigger rod 222. The locking pin 221 exists independently and is triggered by the trigger rod 222 to lock a locking mechanism 23. The trigger rod 222 has an initial position, a first position and a second position. When the trigger rod 222 is located at the initial position, the trigger rod 222 faces away from the locking mechanism 23 and the winding switch 21. When the trigger rod 222 is located at the first position, the trigger rod 222 limits rotation of the locking mechanism 23 and then limits rotation of the head housing; when the trigger rod 222 is located at the second position, the trigger rod 222 triggers the winding switch 21, the winding switch 21 is opened, and the motor drives the spool to rotate to begin winding.

Figure 15:
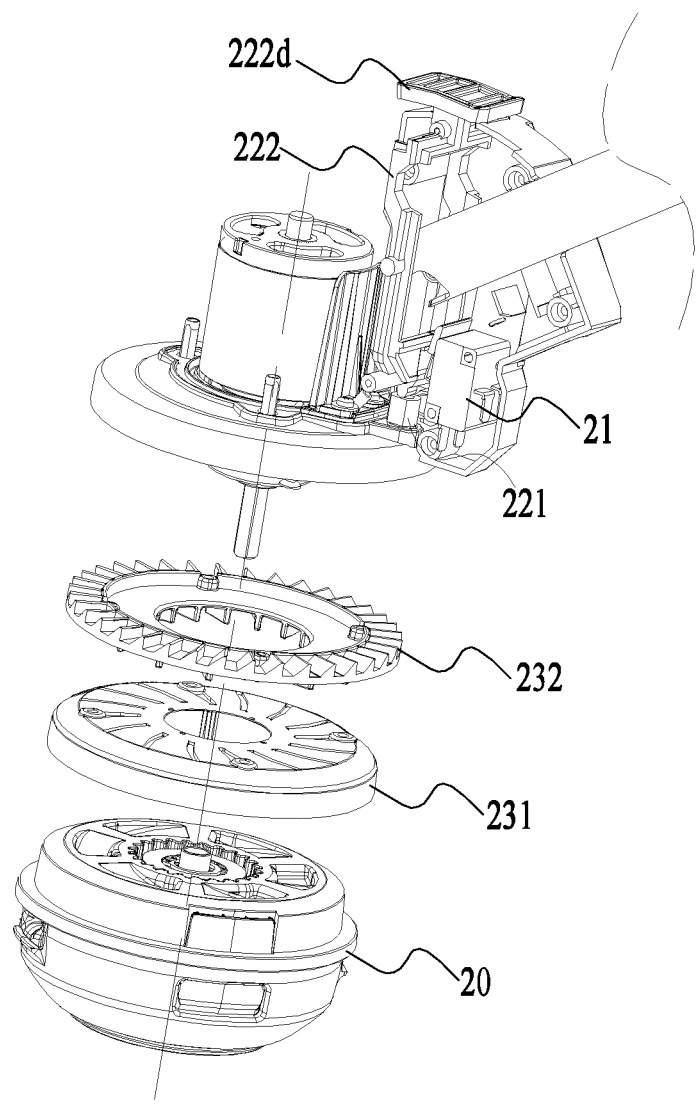
FIG. 15 is an exploded view of the grass trimmer of FIG. 11.

As shown in FIG. 15, the locking pin 221 includes a first end and a second end. The first end is arranged in a channel formed by the casing and can freely slide in the channel; the second end is in direct contact with the locking pin 221. The locking pin 221 is also connected to an elastic piece for resetting. The trigger rod 222 includes a first trigger portion 222a, a second trigger portion 222b, an adaptation portion 222c, and an operating portion 222d. The first trigger portion 222a is configured for directly triggering the locking pin 221; the second trigger portion 222b is configured for triggering the winding switch 21, the groove formed by the adaptation portion 222c is configured for adapting to the structure inside the casing, and the operating portion 222d is exposed outside the casing to be operated by a user for enabling or disabling the automatic winding mode.

The locking mechanism 23 is specifically a support plate assembly including a first rotating piece 231 and a second rotating piece 232. The second rotating piece 232 is formed with teeth into which the locking pin 221 may be inserted, and specifically, when a user needs to lock the rotation of the support plate assembly, the user merely needs to operate the locking pin 221 into the tooth space.

According to the grass trimmer 200 provided by the present example, when the user needs winding, the operating portion 222d is pressed, the entire trigger rod 222 moves in the direction towards the support plate assembly, the locking pin 221 overcomes the elastic force of the elastic piece under the driving of the trigger rod 222 and extends into the tooth space of the second rotating piece 232, and the rotation of the second rotating piece 232 is limited. Since the second rotating piece 232 and the first rotating piece 231 are fixedly connected to each other, the first rotating piece 232 is also limited while the second rotating piece 231 is limited, and at this time, the rotation of the entire support plate assembly around the output shaft is limited. Further, under the cooperation of the first limiting piece and the second limiting piece, the rotation of the head housing is limited, and relative movement can be generated between the head housing and the spool. At this time, the trigger rod 222 is located at the first position, and with the first trigger portion 222a as a circle center, the trigger rod 222 is toggled to rotate along a first direction to a second position. The second trigger portion 222b triggers the winding switch 21. At this time, the motor is started under the control of the winding switch 21 and drives the spool to rotate at a high speed relative to the head housing, the trimmer line is wound onto the spool, and until the winding is completed, with the first trigger portion 222a as the circle center, the user loosen the toggling, and the trigger rod 222 rotates along a second direction to the first position, the operating portion 222d is released, the locking pin 221 is reset under the action of the elastic piece, the entire trigger rod 222 is reset to the initial position under the action of the locking pin 221, the motor stops rotating, and winding ends.

Figure 16:
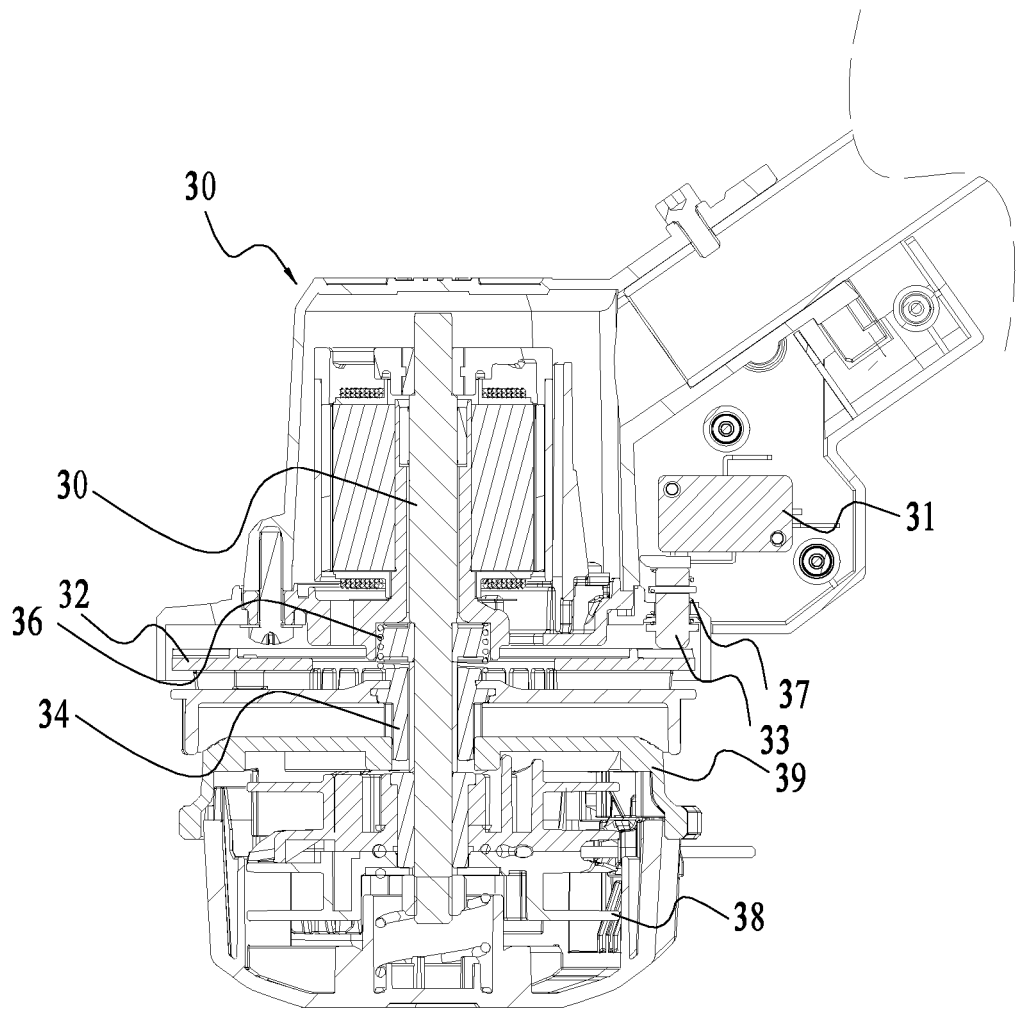
FIG. 16 is a sectional view of an example grass trimmer.

FIG. 16 shows a partial structure of a grass trimmer according to a third example. The automatic winding structure of the grass trimmer in the present example is substantially the same as that in the first example. Specifically, when the grass trimmer is in an automatic winding mode, the grass trimmer may have a trimmer head 30 and a winding switch 31 which are the same as the trimmer head and the winding switch in the first example, and differs in the trigger manner of a locking mechanism 32. The portions of the first example that are compatible with the present example may be applied to the present example, and merely the differences between the present example and the first example will be described below.

Figure 17:
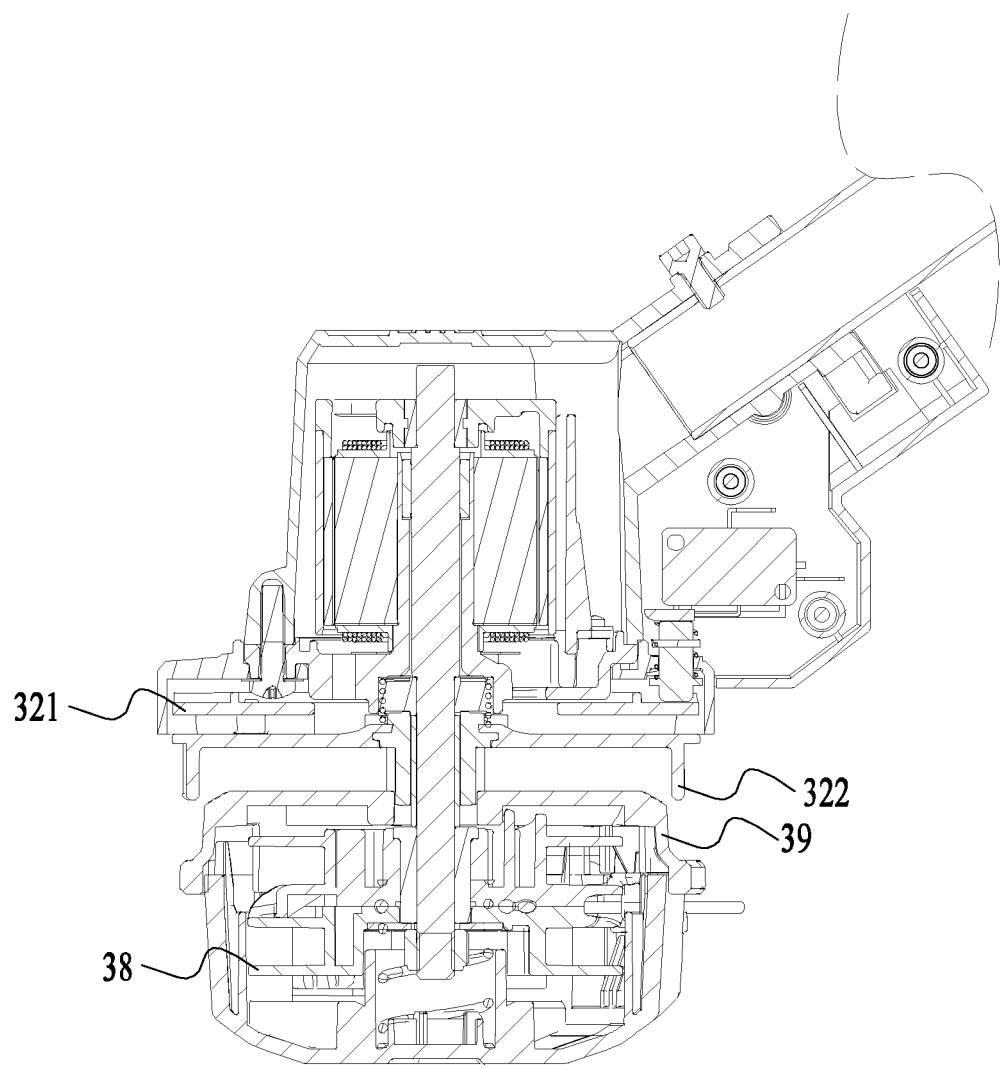
FIG. 17 is a sectional view of the grass trimmer of FIG. 16 when a locking mechanism is in a locked position.
Figure 18:
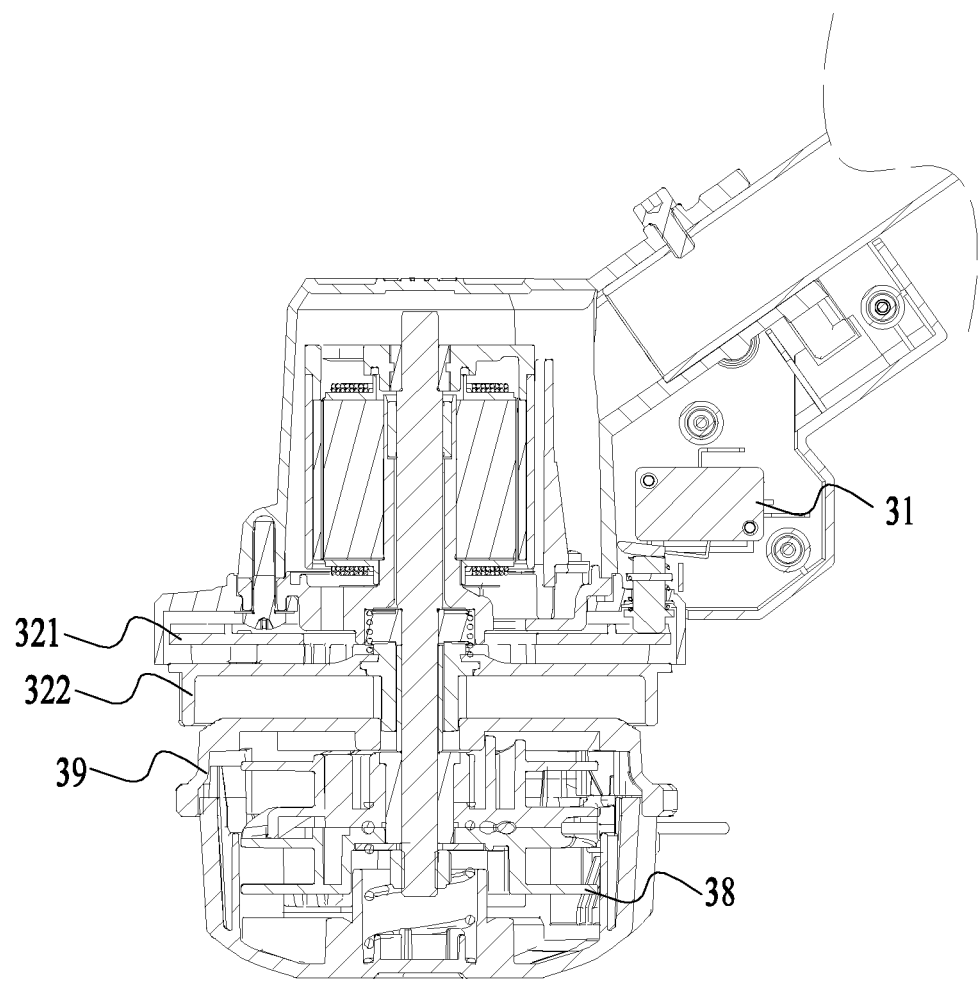
FIG. 18 is a sectional view of the grass trimmer of FIG. 17 when a locking pin is in a trigger position.

As shown in FIGS. 16 to 18, a locking pin 33 has a first position and a second position, and when the locking pin 33 is located at the first position, the winding switch 31 is not triggered; when the locking pin 33 is located at the second position, the locking mechanism 32 is locked by the locking pin 33, meanwhile the locking mechanism 32 can lock the rotation of a spool 38 or a head housing 39, and at this time, the motor can drive the spool 38 or the head housing 39 to rotate and the trimmer line can be wound onto the spool 38. Specifically, in the present example, the locking mechanism 32 also includes a first rotating piece 321 and a second rotating piece 322, and an output shaft 35 is provided with a sleeve 34 onto which the locking mechanism 32 is sleeved. On one hand, the locking mechanism 32 can move in the axis direction of the output shaft 35 along with the sleeve 34; on the other hand, the locking mechanism 32 can also rotate synchronously with the sleeve 34. In an example, the sleeve 34 is provided with an internal transmission structure (not shown in the figure) that can rotate synchronously with the output shaft 35, and the output shaft 35 is provided with an external transmission structure (not shown in the figure) that drives the sleeve 34. The end of the locking mechanism 32 facing away from the sleeve 34 is further provided with a first elastic piece 36, and when the grass trimmer normally trims grass, the first elastic piece 36 can push the locking mechanism 32 to a third position facing away from the locking pin 33. When a user needs winding, the locking mechanism 32 may be pushed so that the first limiting portion of the locking mechanism 32 cooperates with the locking pin 33. At this time, the locking mechanism 32 is limited by the locking pin 33 and meanwhile locks the rotation of the head housing 39. The locking mechanism 32 further abuts against the winding switch 31, so that relative rotation can be generated between the head housing 39 and the spool 38, and the winding can be performed. A second elastic piece is further provided on the locking pin 33, and when the user releases the locking mechanism 32, the locking mechanism 32 is reset to the third position under the action of the first elastic piece 36; and meanwhile, the locking pin 33 is also reset to the first position under the action of the second elastic piece. In the present example, the sleeve 34 can be considered as a part of the locking mechanism 32, the locking mechanism 32 can be operated by a user to move up and down, so that a part of the locking mechanism 32 that is operated by the user can be regarded as the operating portion.

Figure 19:
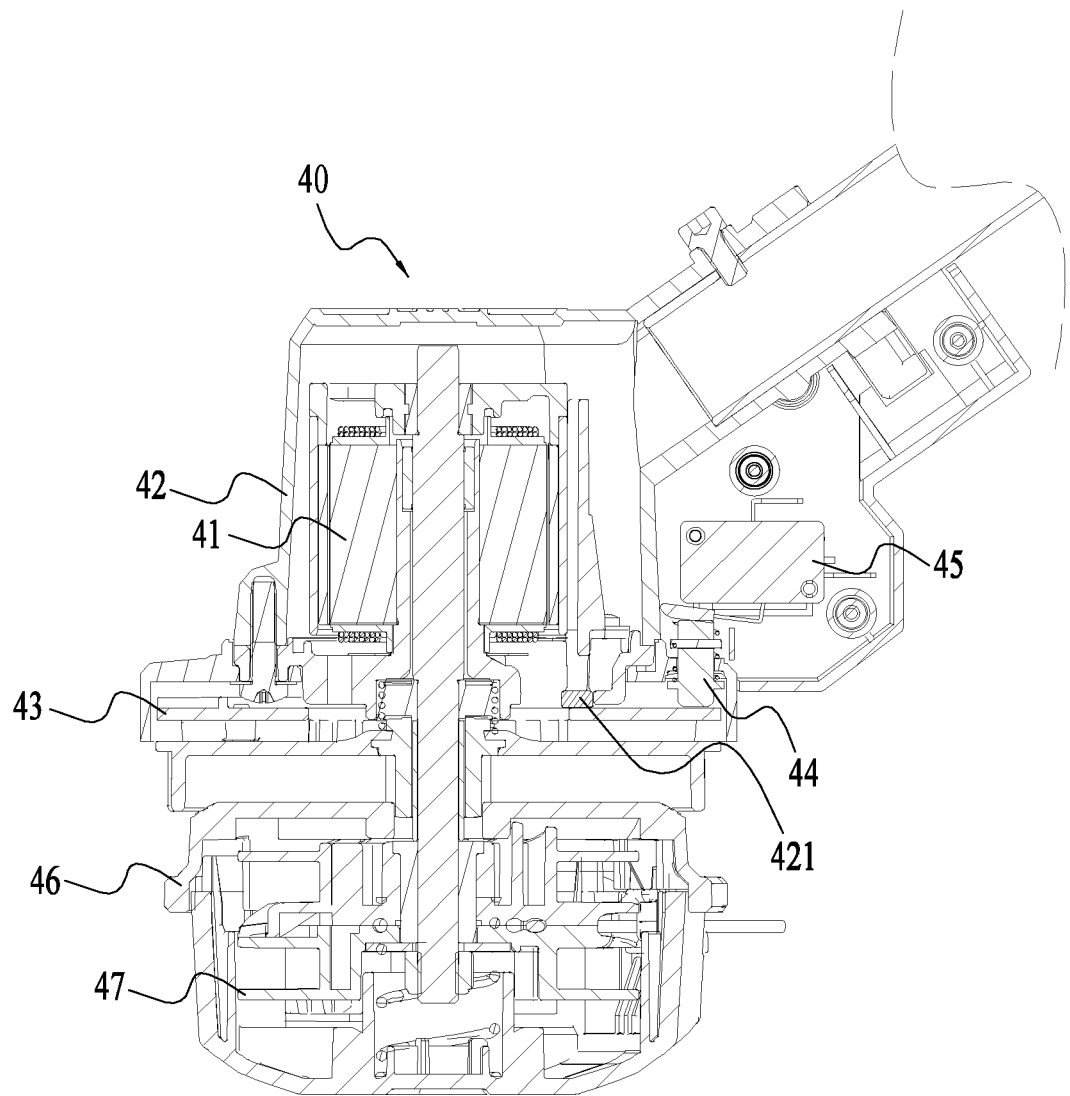
FIG. 19 is also a sectional view of an example grass trimmer.

FIG. 19 shows a partial structure of a grass trimmer according to a fourth example. The automatic winding structure of the grass trimmer in the present example is substantially the same as that in the first example. Specifically, when the grass trimmer is in an automatic winding mode, the grass trimmer may have a trimmer head 40 and a winding switch 45 which are the same as the trimmer head and the winding switch in the first example, and differs in the trigger manner of a locking mechanism 43. The portions of the first example that are compatible with the present example may be applied to the present example, and merely the differences between the present example and the first example will be described below.

In the present example, the locking mechanism 43 is no longer formed with a first limiting portion, and the rotation of the locking mechanism 43 is limited by the limiting piece 421 provided on a housing 42. At the same time, the grass trimmer is further provided with a locking pin 44 for triggering the winding switch 45, and has a specific structure substantially the same as the structure in the third example, and detailed description is not provided herein. Specifically, the limiting piece 421 may be a plastic piece integrally formed with the motor 41 and the housing 42, or an elastic piece or other wear-resistant pieces provided on the housing 42. In an example, when a user pushes the locking mechanism 43, the locking mechanism 43 moves in the direction of the output shaft, moves close to the limiting piece 421 and meanwhile can abut against the locking pin 44, the locking pin 44 can trigger the opening of the winding switch 45, the limiting piece 421 can limit the rotation of the locking mechanism 43, and the locking mechanism 43 can limit the rotation of the head housing 46 at the same time, thereby causing relative rotation between the head housing 46 and the spool 47. Therefore, winding can be achieved.

In the present example, the locking mechanism 43 can be operated by a user to move up and down, so that a part of the locking mechanism 43 that is operated by the user can be regarded as the operating portion.

Figure 20:
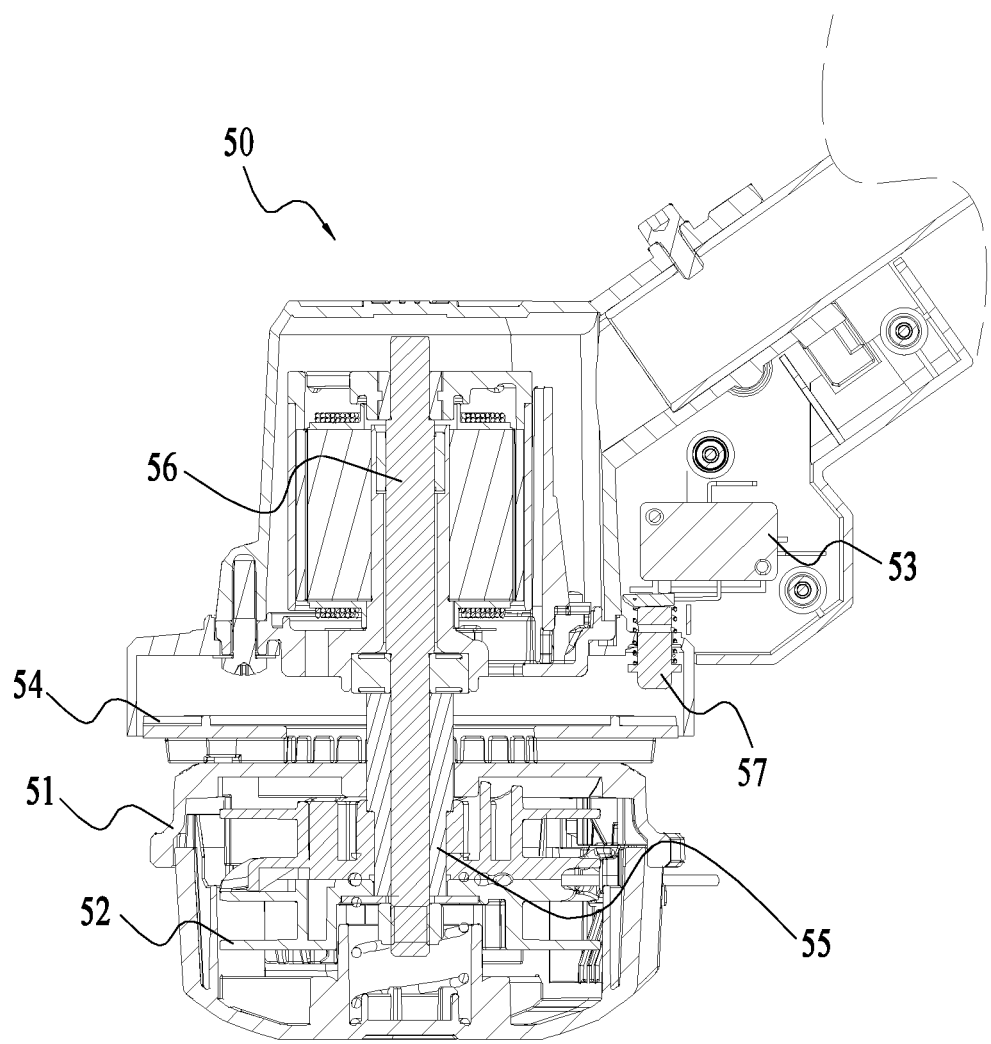
FIG. 20 is also a sectional view of an example grass trimmer.

FIG. 20 shows a partial structure of a grass trimmer according to a fifth example. The automatic winding structure of the grass trimmer 500 in the present example is substantially the same as that in the first example. Specifically, when the grass trimmer is in an automatic winding mode, the grass trimmer may have a winding switch 53 which is the same as the winding switch in the first example, and differs in the trigger manner of a locking mechanism 54. The portions of the first example that are compatible with the present example may be applied to the present example, and merely the differences between the present example and the first example will be described below.

Figure 21:
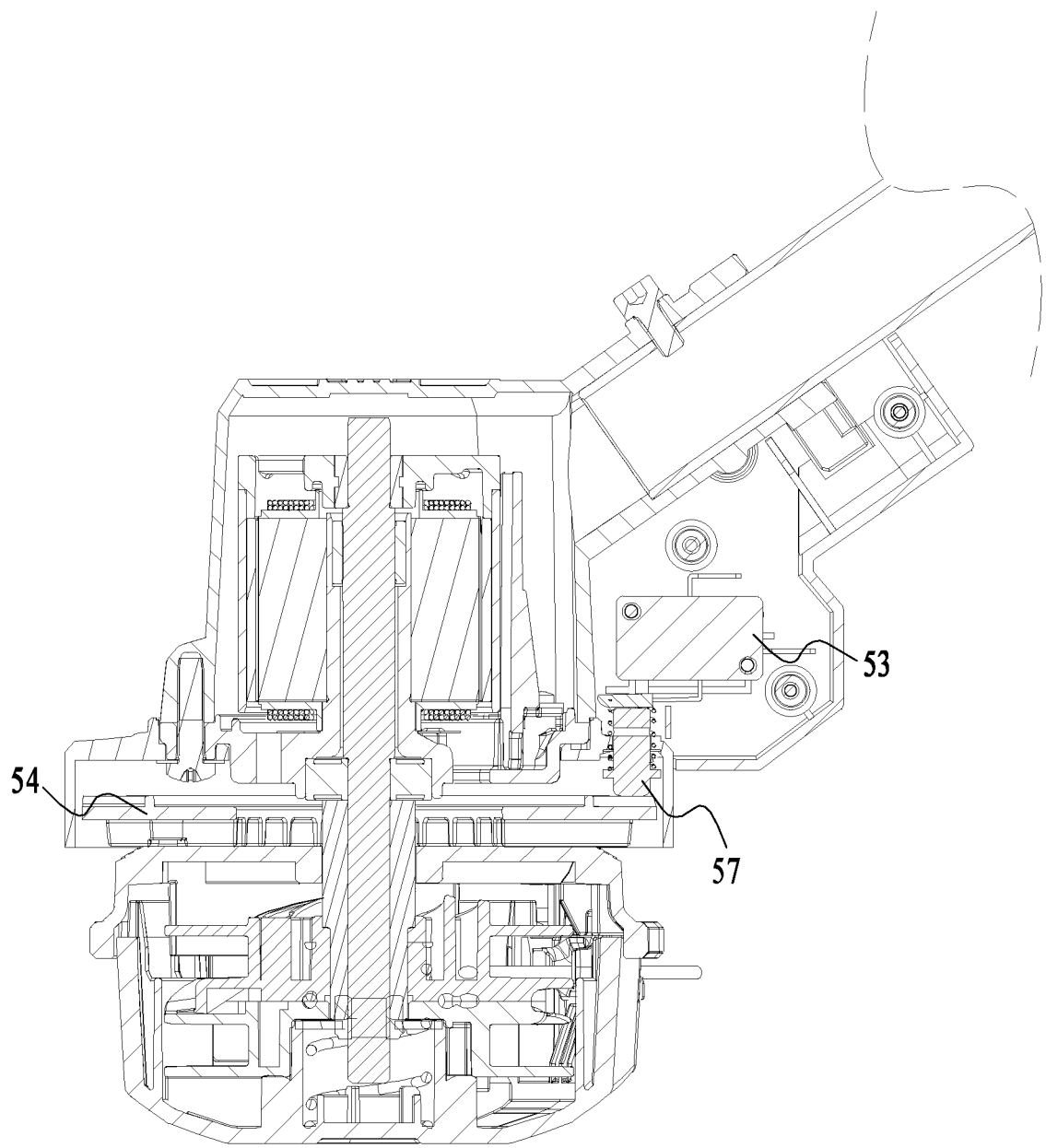
FIG. 21 is a sectional view of the grass trimmer of FIG. 20 when a locking mechanism is in a locked position.
Figure 22:
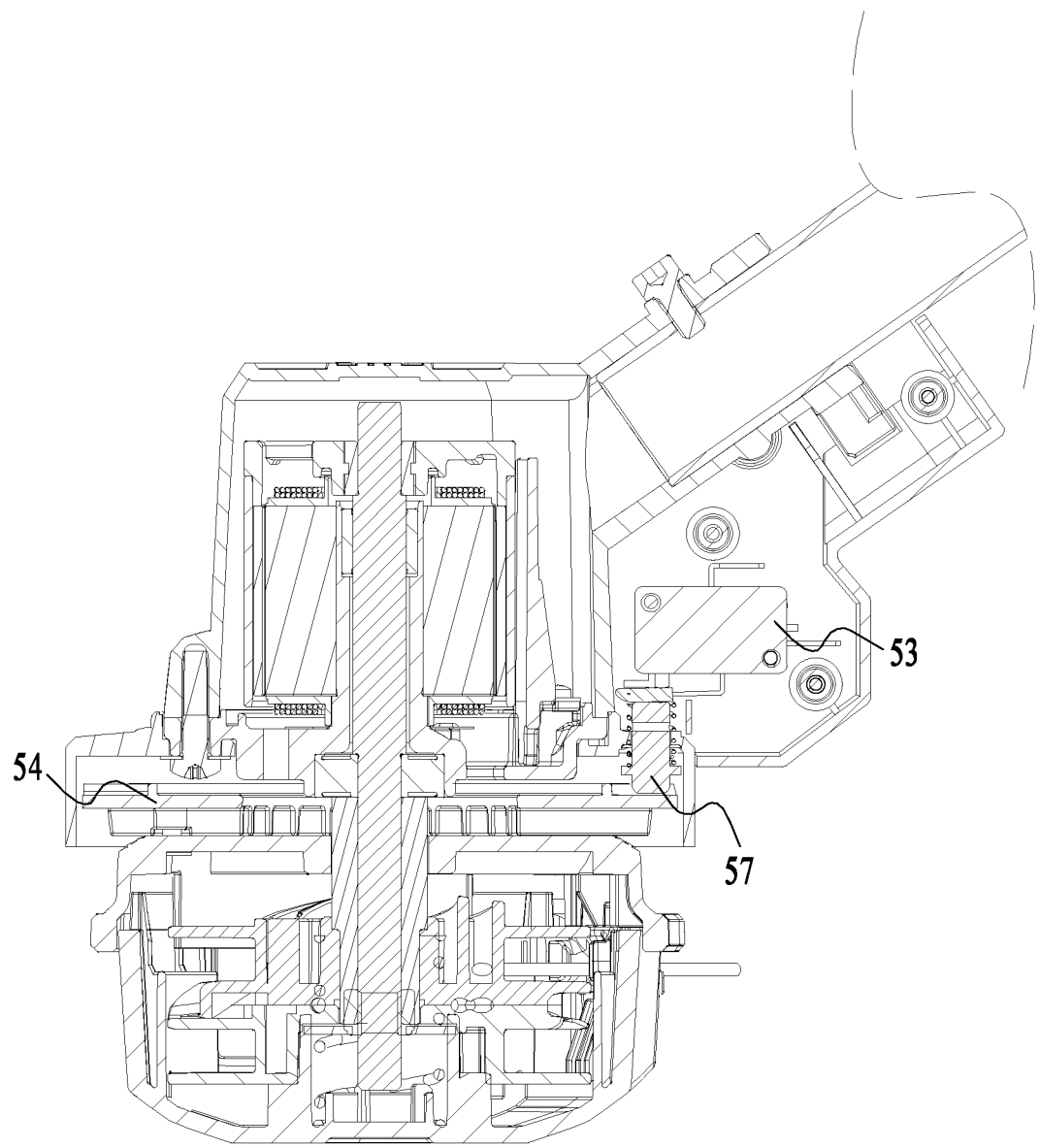
FIG. 22 is a sectional view of the grass trimmer of FIG. 20 when a locking pin is in a trigger position.

As shown in FIGS. 20 to 22, in the present example, a trimmer head 50 includes a head housing 51 and a spool 52, where the spool 52 is arranged on an output shaft 56 through a bushing 55 and can be fixedly connected to the output shaft 56. The head housing 51 has a first position and a second position relative to the spool 52. When the head housing 51 is located at the first position, the locking mechanism 54 can be kept far away from a locking pin 57, and the grass trimmer can normally trim grass; when the head housing 51 is located at the second position, the head housing 51 can face toward and abut against the locking mechanism 54, so that the first limiting portion of the locking mechanism 54 can further abut against the locking pin 57, and the rotation of the locking mechanism 54 is locked, thereby causing relative rotation between the head housing 51 and the spool 52. The locking pin 57 further triggers the winding switch 53, which causes the motor to drive the head housing 51 and the spool 52 to rotate relative to each other, thereby allowing winding.

In the present example, the head housing 51 can be operated by a user to move up and down, so that a part of the head housing 51 that is operated by the user can be regarded as the operating portion.

In an optional example, the locking mechanism 54 may not be provided with the first limiting portion, while a limiting piece may be provided on the housing of the motor, and when the locking mechanism 54 abuts against the locking pin 57, the limiting piece can be in contact with the locking mechanism 54 and can limit rotation of the locking mechanism 54, and at this time, the locking pin 57 can trigger the winding switch 53, thereby causing relative rotation of the head housing 51 and the spool 52, and thereby winding begins.

Figure 23:
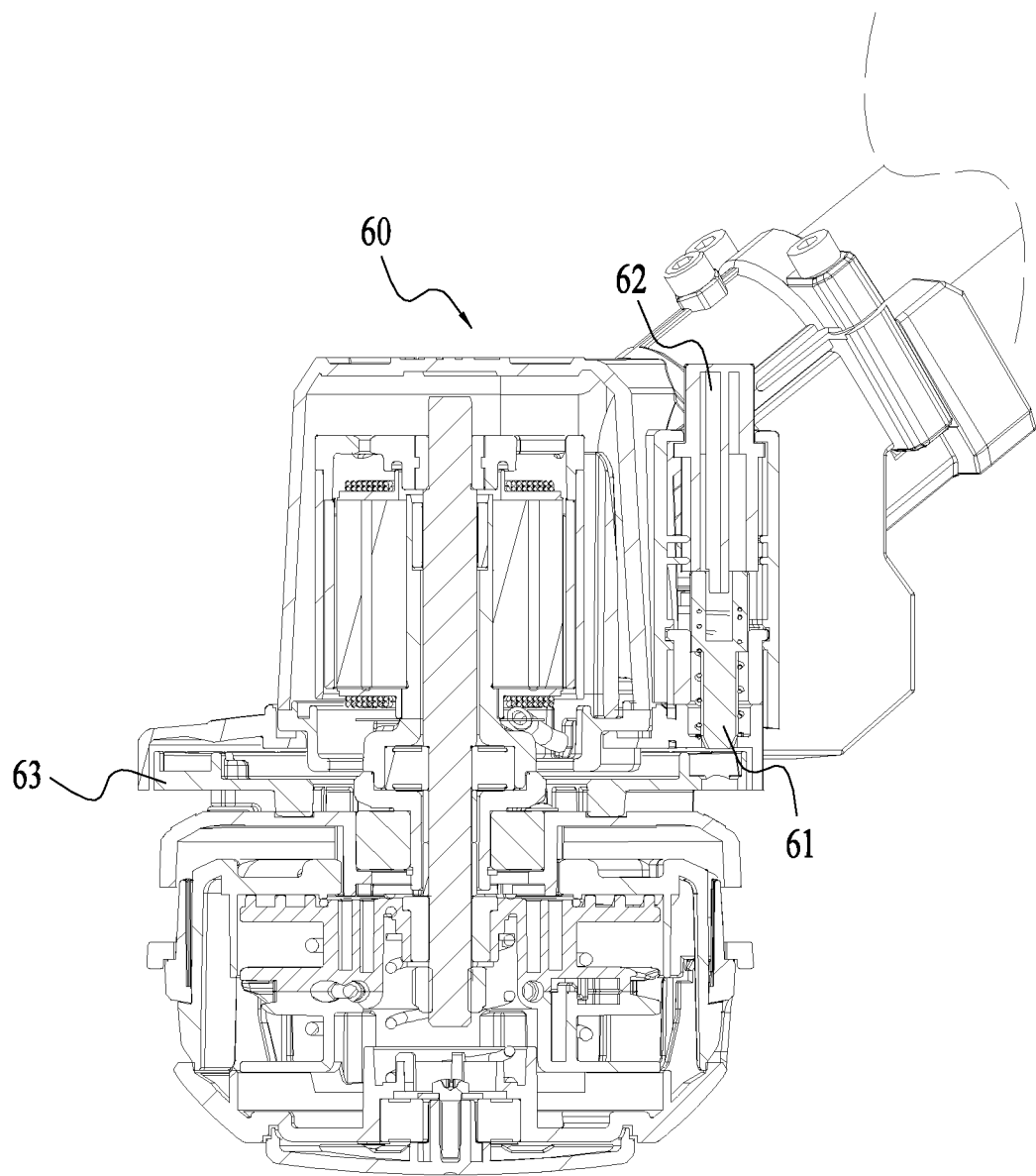
FIG. 23 is also a sectional view of an example grass trimmer.

FIG. 23 shows a partial structure of a grass trimmer according to a sixth example. The automatic winding structure of the grass trimmer in the present example is substantially the same as that in the first example. Specifically, when the grass trimmer is in an automatic winding mode, the grass trimmer may have a trimmer head 60 which is the same as the trimmer head in the first example, and differs in the trigger manner of a locking mechanism 63. The portions of the first example that are compatible with the present example may be applied to the present example, and merely the differences between the present example and the first example will be described below.

As shown in FIG. 23, the locking pin 61 is arranged at any position around the housing of the motor and can be triggered by an external trigger rod 62. The trigger rod 62 can be arranged at any position around the housing of the motor. In some optional examples, the locking pin 61 can also be driven by a second motor (not shown in the figure) to allow access to the first limiting portion of the locking mechanism. Alternatively, the first motor for driving the trimmer head 60 to rotate may be provided with a two-stage transmission mechanism (not shown in the figure), so that the power of the first motor can be led out to the locking pin 61 and the locking pin 61 can be driven to move between a first position where the locking mechanism can be locked and a second position away from the locking mechanism. In fact, a traction mechanism (not shown in the figure) provided on the connecting rod may cooperate with a lever structure (not shown in the figure) provided on the locking pin 61 so that the locking pin 61 is driven to switch between the first position and the second position.

The above illustrates and describes basic principles, main features and advantages of the present disclosure. It is to be understood by those skilled in the art that the above examples do not limit the present disclosure in any form, and solutions obtained by means of equivalent substitution or equivalent transformation fall within the protection scope of the present disclosure.

What is claimed is:

1. A grass trimmer, comprising:
   a trimmer head comprising a spool and a head housing, wherein the spool is configured for a trimmer line to wind around and the head housing is configured to accommodate at least part of the spool;
   a driving device configured to drive the trimmer head to rotate around an axis, wherein the driving device comprises a motor having an output shaft, and the grass trimmer has an automatic winding mode in which the motor is configured to drive at least one of the spool or the head housing to cause a relative rotation between the spool and the head housing so as to wind the trimmer line onto the spool;
   an operating assembly comprising an operating portion operated by a user;
   a winding switch configured to control the automatic winding mode to be enabled when the operating portion is operated; and
   a locking mechanism, wherein, when the operating portion is operated, the operating assembly triggers the winding switch,
   wherein the operating assembly and the locking mechanism are mechanically coupled such that when the operating portion is operated, movement of the operating portion is mechanically transmitted to the locking mechanism to cause the locking mechanism to move into contact with and to lock at least one of the head housing or the spool.

2. The grass trimmer of claim 1, wherein the operating assembly comprises:

a first trigger portion configured to release thea rotation of the head housing or the spool when the operating portion is moved to a first position and lock the rotation of the head housing or the spool when the operating portion is moved to a second position; and a second trigger portion configured to close the winding switch when the operating portion is moved to the first position and activate the winding switch when the operating portion is moved to the second position.

3. The grass trimmer of claim 2, wherein the locking mechanism and the head housing rotate synchronously and the operating assembly limits the rotation of the locking mechanism to lock the rotation of the head housing when the operating portion moves to the second position.

4. The grass trimmer of claim 2, wherein the locking mechanism and the spool rotate synchronously and the operating assembly limits the rotation of the locking mechanism to lock rotation of the spool when the operating portion moves to the second position.

5. The grass trimmer of claim 1, wherein the operating assembly comprises:
an operating member forming the operating portion; and
a locking element configured to be coupled with the operating member;
wherein the locking mechanism rotates synchronously with the spool and the locking member is driven by the operation member to move to a position where the locking mechanism is locked.

6. The grass trimmer of claim 1, further comprising:
a rear housing formed with a coupling portion for coupling an energy source; and
a connecting rod for connecting the driving device and the rear housing;
wherein the rear housing is disposed at a rear end of the connecting rod and the operating assembly is disposed at a front end of the connecting rod.

7. The grass trimmer of claim 6, wherein the winding switch is disposed at the front end of the connecting rod.

8. The grass trimmer of claim 1, wherein the driving device comprises a front housing formed with a receiving cavity for receiving the motor and the front housing is connected with a mounting portion for mounting the winding switch.

9. The grass trimmer of claim 1, wherein the locking mechanism comprises:

a first rotating piece, which is configured to rotate synchronously with the spool or the head housing; and
the operating assembly comprises:
a first trigger portion which is configured to release rotation of the first rotating piece in condition that the operating assembly is moved to a first position and lock the rotation of the first rotating piece in condition that the operating assembly is moved to a second position; and
a second trigger portion which is configured to close the winding switch in condition that the operating assembly is moved to the first position and drive the winding switch to be opened in condition that the operating assembly is moved to the second position.

10. The grass trimmer of claim 1, wherein the locking mechanism comprises:
a first rotating piece, which is configured to rotate synchronously with the spool or the head housing; and
the operating assembly comprises:
a knob, which is formed with the operating portion; and
a locking element, which is configured to lock a rotation of the first rotating piece when the knob is operated by the user;
wherein the knob and the locking element form a whole capable of moving together.

11. The grass trimmer of claim 10, wherein the locking element is a locking pin, the first rotating piece is formed with a limiting portion for mating with the locking pin, and the locking pin locks the rotation of the first rotation piece when the locking pin moves to mate with the limiting portion.

12. The grass trimmer of claim 1, further comprising an elastic piece, which is configured to reset the operating portion.

13. The grass trimmer of claim 1, wherein the trimmer head is capable of rotating clockwise about the axis and also rotating counterclockwise about the axis when the operating portion is not operated.

14. The grass trimmer of claim 1, wherein the head housing is capable of rotating clockwise about the axis and also rotating counterclockwise about the axis when the operating portion is not operated.

* * * * *